United States Patent
Wang et al.

(10) Patent No.: US 8,848,114 B2
(45) Date of Patent: Sep. 30, 2014

(54) CONTROLLING POLARIZATION FOR LIQUID CRYSTAL DISPLAYS

(76) Inventors: Ran-Hong Raymond Wang, Irvine, CA (US); Min-Shine Chow Wang, Irvine, CA (US)

( * ) Notice: Subject to any disclaimer, the term of this patent is extended or adjusted under 35 U.S.C. 154(b) by 0 days.

(21) Appl. No.: 13/098,355

(22) Filed: Apr. 29, 2011

(65) Prior Publication Data
US 2011/0205471 A1    Aug. 25, 2011

Related U.S. Application Data

(63) Continuation of application No. 11/438,905, filed on May 23, 2006, which is a continuation-in-part of application No. 11/298,755, filed on Dec. 9, 2005, which is a continuation-in-part of application No. 11/135,609, filed on May 23, 2005, now Pat. No. 7,633,583.

(51) Int. Cl.
    *G02F 1/1335*    (2006.01)
    *G02F 1/1333*    (2006.01)
    *G02F 1/13363*   (2006.01)

(52) U.S. Cl.
    CPC ............ *G02F 1/133502* (2013.01); *G02F 2001/133638* (2013.01); *G02F 2413/03* (2013.01); *G02F 2201/50* (2013.01); *G02F 2001/133531* (2013.01); *G02F 1/13363* (2013.01); *G02F 2001/133541* (2013.01); *G02F 2413/07* (2013.01); *G02F 1/133528* (2013.01)
    USPC ............... 349/12; 348/161; 348/117; 348/96

(58) Field of Classification Search
    USPC .................... 349/96, 12, 117, 161
    See application file for complete search history.

(56) References Cited

U.S. PATENT DOCUMENTS

| | | | |
|---|---|---|---|
| 3,840,695 | A | 10/1974 | Fischer |
| 4,756,953 | A | 7/1988 | Utsumi |
| 4,764,840 | A | 8/1988 | Petrie et al. |
| 5,694,191 | A | 12/1997 | Strathman et al. |
| 5,759,643 | A | 6/1998 | Miyashita et al. |
| 5,828,488 | A | 10/1998 | Ouderkirk |
| 5,870,160 | A * | 2/1999 | Yanagawa et al. ............ 349/141 |
| 5,986,737 | A | 11/1999 | Evanicky et al. |
| 6,025,897 | A | 2/2000 | Weber et al. |
| 6,080,467 | A | 6/2000 | Weber et al. |

(Continued)

FOREIGN PATENT DOCUMENTS

| | | |
|---|---|---|
| EP | 1 189 097 | 3/2002 |
| EP | 1 450 202 A2 | 8/2004 |

(Continued)

OTHER PUBLICATIONS

Walker, "Circular polarizers in resistive touch screens", Veritas et Visus, Touch Panel, Aug. 2006.
Office Action in U.S. Appl. No. 11/842,017 mailed Jul. 9, 2010.
Notice of Abandonment in U.S. Appl. No. 12/632,509 mailed Sep. 3, 2010.
Preliminary Amendment, dated Aug. 18, 2003, for U.S. Appl. No. 10/370,360.

(Continued)

*Primary Examiner* — James Dudek
(74) *Attorney, Agent, or Firm* — Knobbe, Martens, Olson & Bear LLP

(57) ABSTRACT

Certain embodiments of liquid crystal display protection panels and liquid crystal display protection panel integrals have low reflection for outdoor applications. Various embodiments also have the advantage of being able to provide increased contrast and brightness for certain convenient viewing directions for outdoor viewers wearing polarized sunglasses.

21 Claims, 16 Drawing Sheets

(56) References Cited

U.S. PATENT DOCUMENTS

| | | | |
|---|---|---|---|
| 6,111,697 | A | 8/2000 | Merrill et al. |
| 6,124,905 | A | 9/2000 | Iijima |
| 6,129,980 | A | 10/2000 | Tsukada et al. |
| 6,181,394 | B1 | 1/2001 | Sanelle et al. |
| 6,184,969 | B1 | 2/2001 | Fergason |
| 6,215,537 | B1 | 4/2001 | Tsumura |
| 6,262,842 | B1 | 7/2001 | Ouderkirk et al. |
| 6,285,425 | B1 | 9/2001 | Akins et al. |
| 6,317,183 | B2 | 11/2001 | Komatsu |
| 6,392,727 | B1 | 5/2002 | Larson et al. |
| 6,396,630 | B1 | 5/2002 | Stiens et al. |
| 6,411,344 | B2 | 6/2002 | Fujii |
| 6,456,346 | B1 | 9/2002 | Arai |
| 6,483,559 | B1 | 11/2002 | Hiraki |
| 6,512,512 | B1 | 1/2003 | Blanchard |
| 6,559,834 | B1 | 5/2003 | Murakami |
| 6,572,941 | B1 * | 6/2003 | Murakami et al. ............... 428/34 |
| 6,611,299 | B1 | 8/2003 | Fujii |
| 6,710,837 | B1 | 3/2004 | Song et al. |
| 6,717,641 | B2 | 4/2004 | Arai |
| 6,738,115 | B1 | 5/2004 | Iijima |
| 6,747,720 | B2 | 6/2004 | Saiki et al. |
| 6,771,327 | B2 | 8/2004 | Sekiguchi |
| 6,846,089 | B2 | 1/2005 | Stevenson |
| 6,906,767 | B1 | 6/2005 | Iijima |
| 6,909,486 | B2 | 6/2005 | Wang et al. |
| 6,922,222 | B2 | 7/2005 | Miyachi et al. |
| 6,961,108 | B2 | 11/2005 | Wang et al. |
| 6,972,813 | B1 | 12/2005 | Toyooka |
| 6,995,820 | B2 | 2/2006 | Amimori et al. |
| 6,999,147 | B2 | 2/2006 | Maeda |
| 7,071,925 | B2 | 7/2006 | Matsuda et al. |
| 7,372,510 | B2 | 5/2008 | Abileah |
| 7,633,583 | B2 | 12/2009 | Wang et al. |
| 8,274,631 | B2 | 9/2012 | Wang et al. |
| 2001/0022997 | A1 | 9/2001 | Honda et al. |
| 2003/0001987 | A1 | 1/2003 | Trapani et al. |
| 2003/0020856 | A1 | 1/2003 | Furuhashi et al. |
| 2003/0030626 | A1 | 2/2003 | Matsuda et al. |
| 2005/0018106 | A1 | 1/2005 | Wang et al. |
| 2007/0008471 | A1 | 1/2007 | Wang et al. |
| 2007/0279556 | A1 | 12/2007 | Wang et al. |
| 2011/0205471 | A1 | 8/2011 | Wang et al. |
| 2013/0002994 | A1 | 1/2013 | Wang et al. |

FOREIGN PATENT DOCUMENTS

| | | |
|---|---|---|
| EP | 1 450 202 A3 | 8/2004 |
| WO | WO 97/01788 | 1/1997 |
| WO | WO 01/79923 | 10/2001 |

OTHER PUBLICATIONS

Notice of Withdrawal of the Aug. 20, 2003 Preliminary Amendment, dated Nov. 12, 2003, for U.S. Appl. No. 10/370,360.
Office Action and Restriction Requirement mailed Jan. 29, 2008 for U.S. Appl. No. 11/135,609.
Response to Restriction Requirement, dated Feb. 29, 2008, for U.S. Appl. No. 11/135,609.
Preliminary Amendment, dated Mar. 26, 2008, for U.S. Appl. No. 11/135,609.
Office Action mailed May 22, 2008 for U.S. Appl. No. 11/135,609.
Response to Office Action dated Aug. 5, 2008, for U.S. Appl. No. 11/135,609.
Office Action mailed Nov. 19, 2008 for U.S. Appl. No. 11/135,609.
Request for Continued Examination, dated Dec. 29, 2008, for U.S. Appl. No. 11/135,609.
Office Action mailed Jan. 26, 2009 for U.S. Appl. No. 11/135,609.
Response to Office Action dated Feb. 19, 2009, for U.S. Appl. No. 11/135,609.
Office Action dated Mar. 25, 2009 for U.S. Appl. No. 11/135,609.
Request for Continued Examination, dated May 4, 2009, for U.S. Appl. No. 11/135,609.
Notice of Allowance mailed May 18, 2009 for U.S. Appl. No. 11/135,609.
Request for Continued Examination, dated Jul. 9, 2009, for U.S. Appl. No. 11/135,609.
Notice of Allowance mailed Jul. 27, 2009 for U.S. Appl. No. 11/135,609.
Office Action mailed Jun. 17, 2004 for U.S. Appl. No. 10/370,360.
Response to Office Action and Notification of Filing of Divisional Application, dated Jul. 16, 2004, for U.S. Appl. No. 10/370,360.
Office Action mailed Aug. 16, 2004 for U.S. Appl. No. 10/370,360.
Amendments and Response to Office Action, dated Nov. 3, 2004 for U.S. Appl. No. 10/370,360.
Notice of Allowance dated Feb. 18, 2005 for U.S. Appl. No. 10/370,360.
Office Action mailed Jan. 30, 2006 for U.S. Appl. No. 10/900,565.
Amendment and Response to Office Action, dated Apr. 27, 2006, for U.S. Appl. No. 10/900,565.
Office Action mailed Jul. 11, 2006 for U.S. Appl. No. 10/900,565.
Amendment and Response to Restriction Requirement dated Nov. 13, 2006, for U.S. Appl. No. 10/900,565.
Office Action mailed Feb. 6, 2007 for U.S. Appl. No. 10/900,565.
Amendment and Response to Office Action dated Aug. 3, 2007, for U.S. Appl. No. 10/900,565.
Notice of Allowance dated Sep. 14, 2007 for U.S. Appl. No. 10/900,565.
Request for Continued Examination, dated Dec. 14, 2007, for U.S. Appl. No. 10/900,565.
Notice of Allowance dated Jan. 22, 2008 for U.S. Appl. No. 10/900,565.
Request for Continued Examination, dated Apr. 21, 2008, for U.S. Appl. No. 10/900,565.
Office Action dated May 13, 2008, for U.S. Appl. No. 10/900,565.
Office Action mailed Mar. 30, 2009 for U.S. Appl. No. 11/438,905.
Amendment and Response mailed Sep. 30, 2009 for U.S. Appl. No. 11/438,905.
Office Action mailed Feb. 18, 2010 for U.S. Appl. No. 11/438,905.
Interview Summary in U.S. Appl. No. 11/438,905 mailed Jun. 29, 2010.
RCE and Amendment in U.S. Appl. No. 11/438,905 dated Aug. 17, 2010.
Preliminary Amendment mailed Nov. 3, 2009 for U.S. Appl. No. 11/842,017.
Office Action dated Dec. 14, 2004 in U.S. Appl. No. 10/892,867.
Response to Office Action, dated May 25, 2005, in U.S. Appl. No. 10/892,867.
Notice of Allowance dated Jun. 27, 2005 in U.S. Appl. No. 10/892,867.
Restriction Requirement in U.S. Appl. No. 11/298,755 mailed Sep. 22, 2008.
Response to Restriction Requirement in U.S. Appl. No. 11/298,755 mailed Dec. 17, 2008.
Office Action in U.S. Appl. No. 11/298,755 mailed Mar. 9, 2009.
Response to Office Action in U.S. Appl. No. 11/298,755 dated Jul. 15, 2009.
Office Action in U.S. Appl. No. 11/298,755 mailed Jan. 15, 2010.
Response to Office Action in U.S. Appl. No. 11/298,755 dated Apr. 15, 2010.
Office Action in U.S. Appl. No. 11/298,755 mailed Jul. 7, 2010.
Response to Office Action in U.S. Appl. No. 11/298,755 dated Jan. 6, 2011.
Final Office Action in U.S. Appl. No. 11/298,755 mailed Apr. 15, 2011.
Amendment and Request for Continued Examination in U.S. Appl. No. 11/298,755, filed May 25, 2011.
Notice of Abandonment in U.S. Appl. No. 11/842,017 mailed Feb. 17, 2011.
Office Action for Taiwan Patent Application No. 095118145, dated Dec. 24, 2012.
Office Action for Taiwan Patent Application No. 098121431, dated Dec. 25, 2012.

* cited by examiner

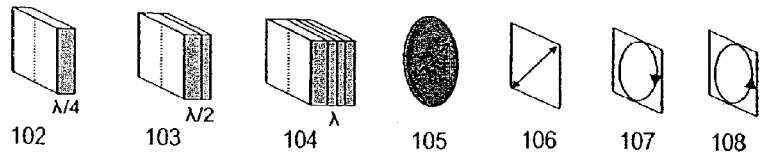
FIG. 1A
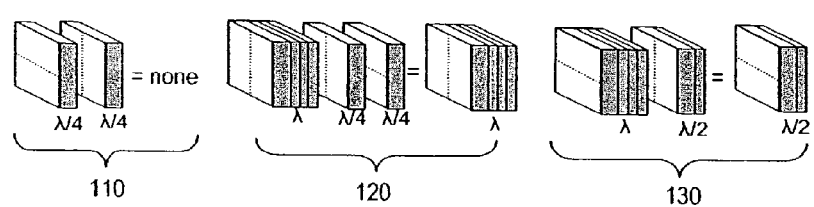
FIG. 1B
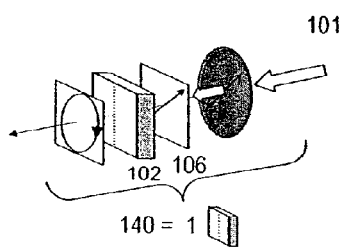
FIG. 1C
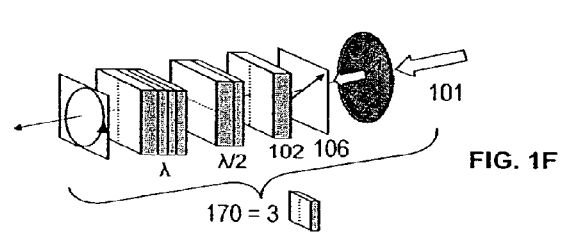
FIG. 1F
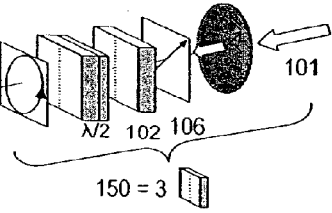
FIG. 1D
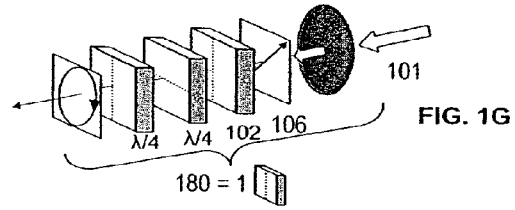
FIG. 1G
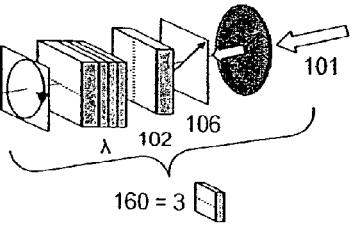
FIG. 1E
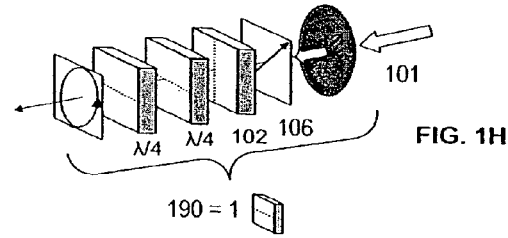
FIG. 1H
FIG. 1

FIG. 6A
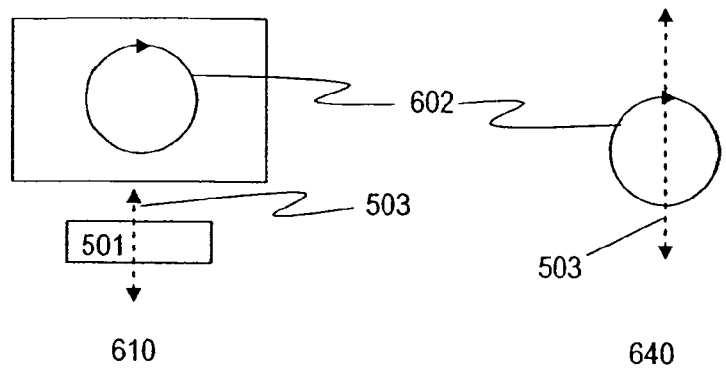
FIG. 6B
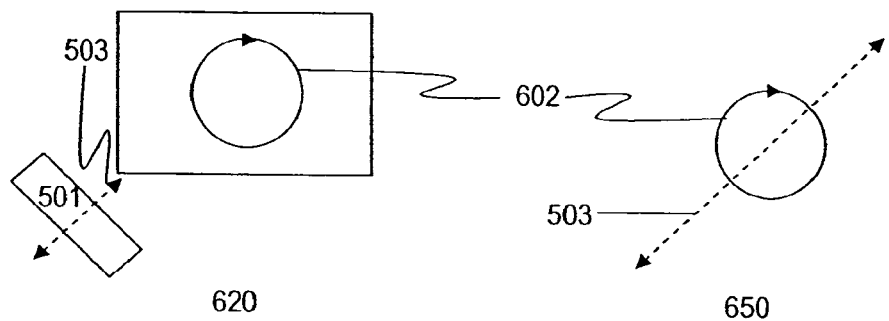
FIG. 6C
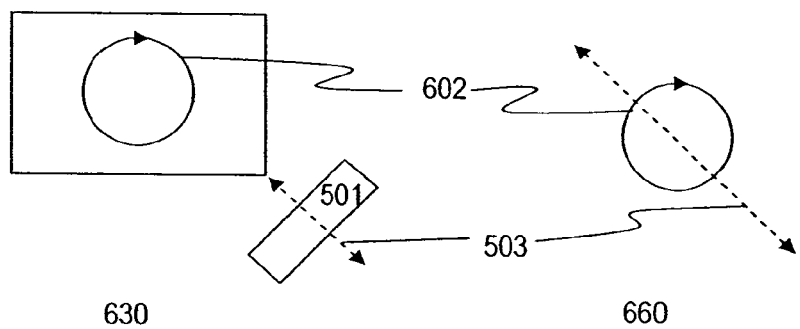
FIG. 6

FIG. 7A
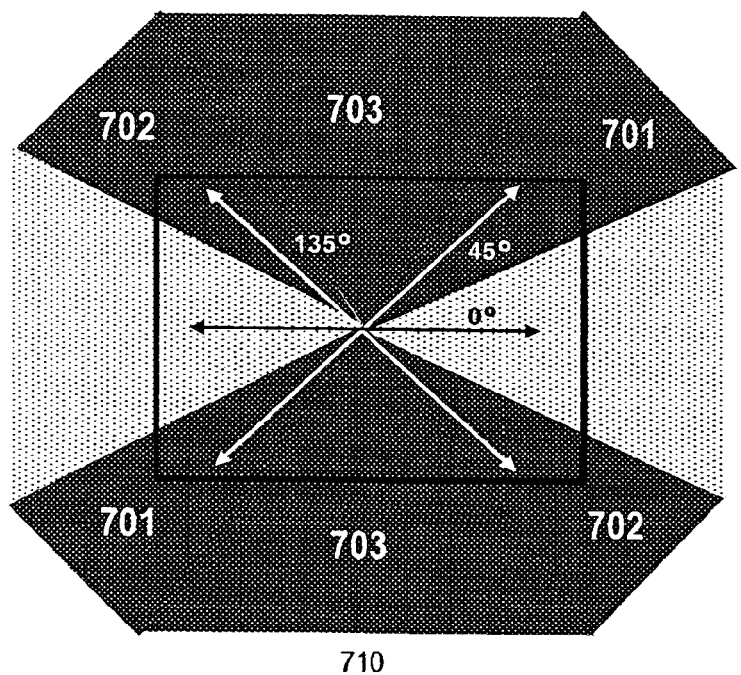
710
FIG. 7B
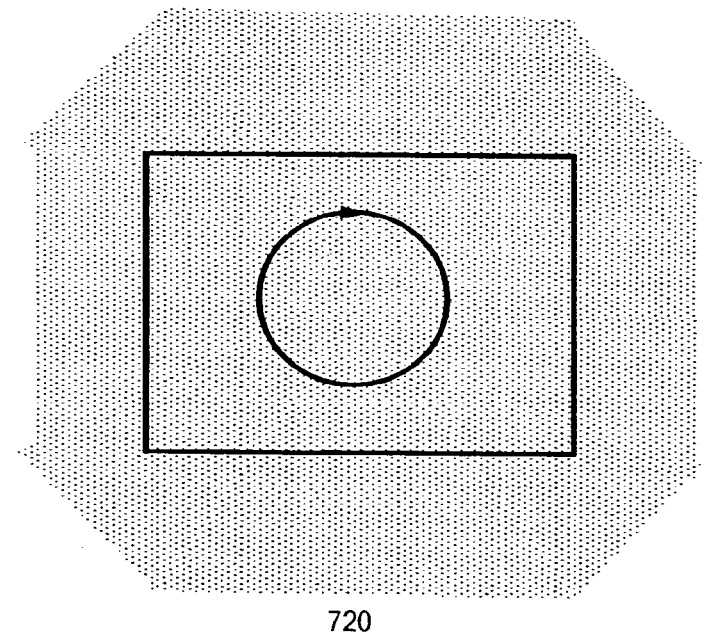
720
FIG. 7

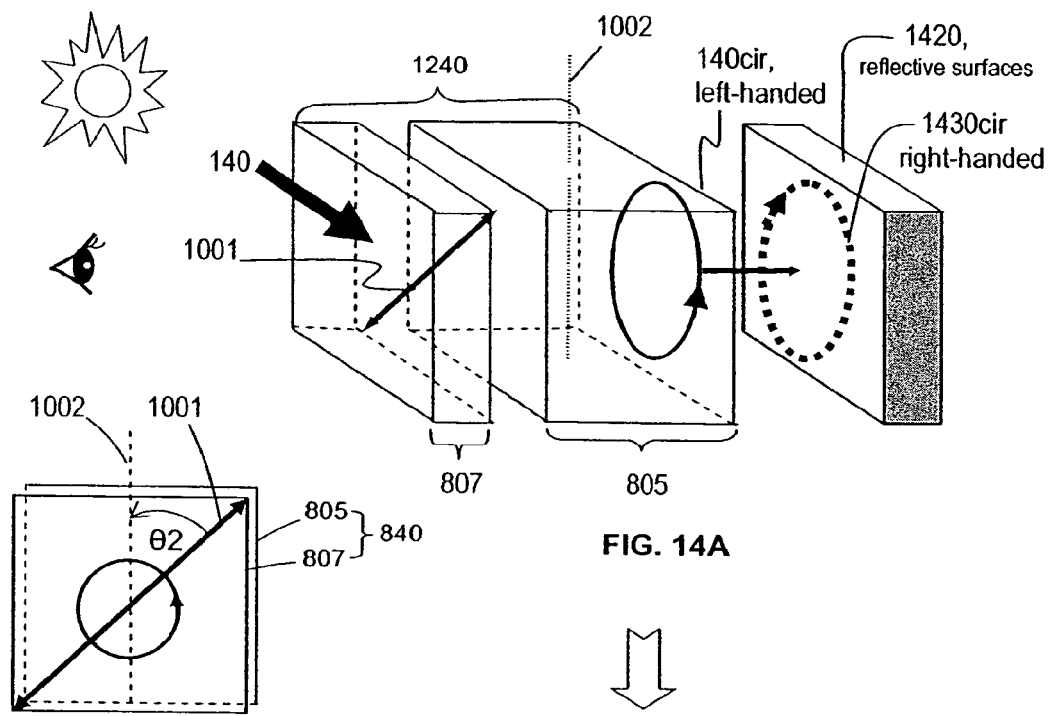
FIG. 14A
$\theta 2 = 45°$
left handed
1410
FIG. 14B
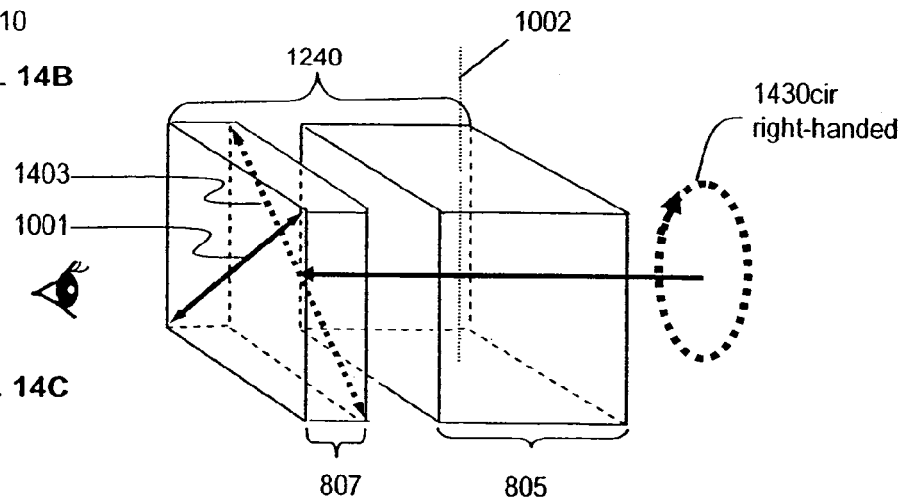
FIG. 14C
FIG. 14

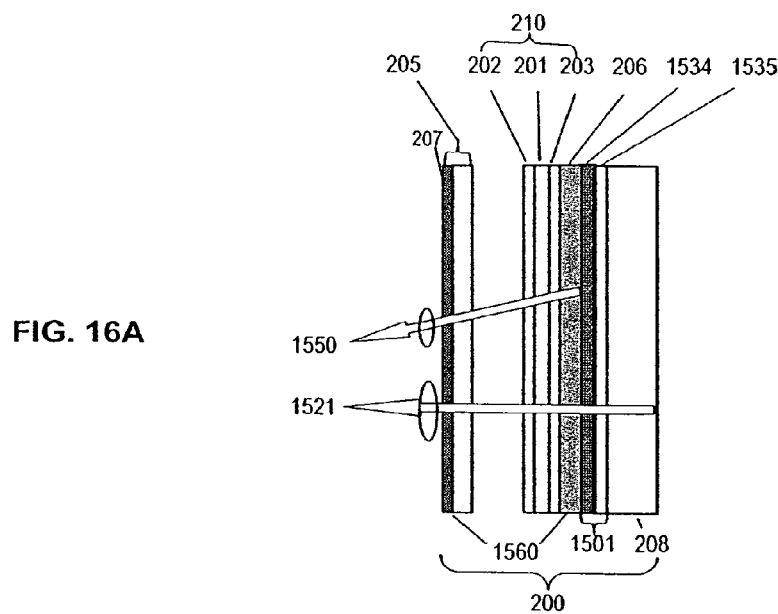
FIG. 16A
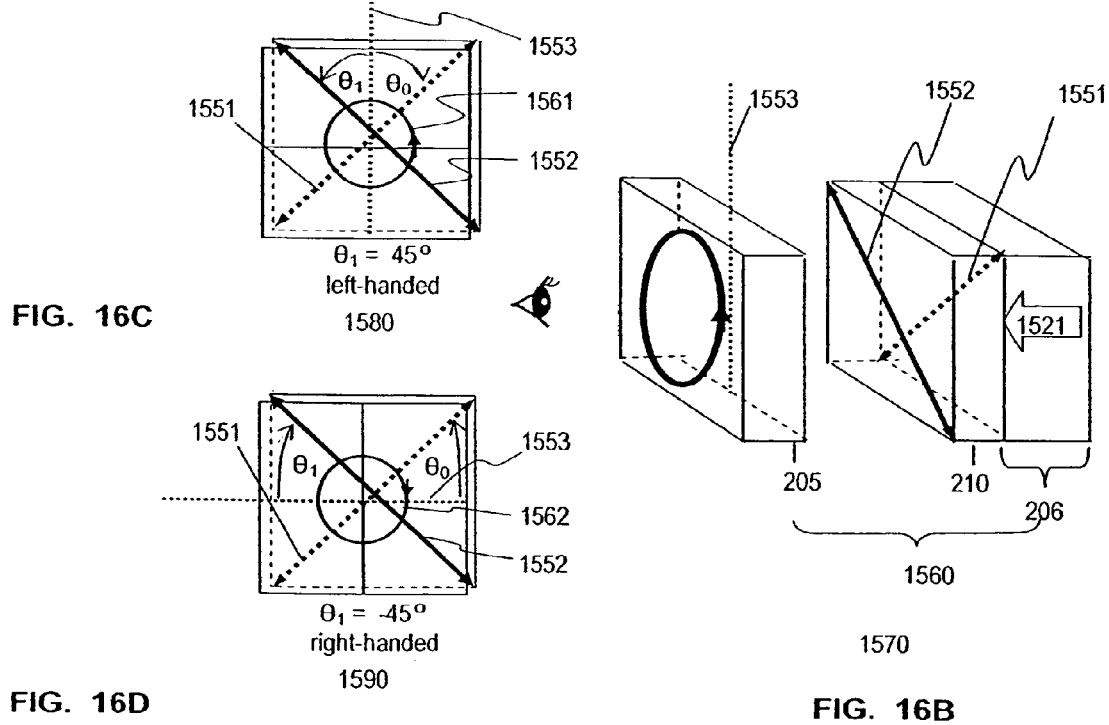
FIG. 16C
FIG. 16D
FIG. 16B

CONTROLLING POLARIZATION FOR LIQUID CRYSTAL DISPLAYS

PRIORITY APPLICATIONS

This application is a continuation of U.S. patent application Ser. No. 11/438,905 titled "Controlling Polarization For Liquid Crystal Displays" filed May 23, 2006, which is a continuation-in-part of U.S. patent application Ser. No. 11/298,755 titled "Controlling Polarization for Liquid Crystal Displays" filed Dec. 9, 2005, which is a continuation-in-part of U.S. patent application Ser. No. 11/135,609 titled "Controlling Polarization For Liquid Crystal Displays" filed May 23, 2005, all three of which are incorporated herein by reference in their entireties.

FIELD OF INVENTION

The present invention relates to liquid crystal displays and polarization.

DESCRIPTION OF RELATED TECHNOLOGY

Many features of liquid crystal displays (LCDs), such as light weight, compact dimensions, low power consumption and high resolution, make LCDs popular choices in various outdoor electronic applications, including for PDAs, navigation systems, rugged notebooks, and information terminals. To avoid direct exposure to the outdoor environment, many LCDs in these applications are overlaid with an outer transparent protection panel, which introduces extra air-surface interfaces and generates a significant amount of back-reflection that reduces the readability of these displays. Often this outer transparent protection panel is a touch interface, such as a resistive touch panel, a capacitive touch panel, a SAW touch panel, a near field touch panel, or a IR touch panel. Some of the devices may also include other functional parts, such as EMI shield, IR block, and screen heater. However, these highly reflective functional parts also generate large amount of back reflection and further interfere with the readability of the system. Thus, providing a sunlight readable display system integrated with a protection panel or a touch panel, EMI, IR block, and screen heater becomes highly challenging.

In addition, a common optical property of a conventional liquid crystal display and a polarized touch panel is that they both selectively pass linearly polarized light from the LCD at a transmission direction with respect to the horizontal and vertical axes defined by the display or touch panel that is normally other than a vertical direction. Viewers of outdoor display systems may often wear vertically polarized sunglasses in order to block out horizontally polarized sunlight, especially in some working environments, such as on the sea or in the air, where the horizontally polarized sunlight is particularly strong. A conventional liquid crystal display or a liquid crystal display with a polarized touch screen that emits linearly polarized light would thus appear to be black for viewers wearing polarized sunglasses for common viewing directions, which is inconvenient for outdoor applications.

SUMMARY

Certain embodiments of liquid crystal displays, liquid crystal display protection panels and liquid crystal display protection panel integrals have low reflection for outdoor applications and also have the advantage of being able to provide increased contrast and brightness for certain convenient viewing directions for outdoor viewers wearing polarized sunglasses.

One embodiment, for example, comprises a liquid crystal display comprising: a liquid crystal cell configured to modulate light; a linear polarizer layer forward said liquid crystal cell; a retarder layer comprising one or more retarders; and a display front surface through which said modulated light exits, wherein said one or more retarders and said linear polarizer layer are oriented such that said modulated light that exits said display front surface has an elliptical or circular polarization.

Another embodiment comprises a functional part integrated display comprising: a liquid crystal cell configured to modulate light defining vertical and horizontal axes, said liquid crystal cell comprising a liquid crystal layer sandwiched between two sheets of transparent electrodes; a first linear polarizer forward said liquid crystal cell, said first linear polarizer having a first linear polarization axis; a first retarder layer forward said first linear polarizer, said first retarder layer has a retardance of about $(2n+1)\lambda/4$ and a first slow axis which forms an angle $\theta_1$ with respect to said first linear polarization axis, where n is an integer and $\lambda$ between about 400 to 700 nanometers (nm); a functional element forward of said first retarder layer, said functional element comprising at least one of an EMI shield, an infrared filter, and an LCD heater; a second retarder layer forward of said functional element, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ with respect to said second slow axis; and a display front surface through which said modulated light exits.

Another embodiment comprises a touch panel integrated display comprising a liquid crystal cell configured to modulate light defining vertical and horizontal axes, said liquid crystal cell comprising a liquid crystal layer sandwiched between two sheets of substantially optically transmissive electrodes; a first linear polarizer forward said liquid crystal cell, said first linear polarizer having a first linear polarization axis; a first retarder layer forward said first linear polarizer, said first retarder layer having a retardance of about $(2n+1)\lambda/4$ and a first slow axis which forms an angle $\theta_1$ to said first linear polarization axis, where n is an integer and $\lambda$ is between about 400 nm to 700 nm; a resistive touch panel forward of said first retarder layer; a second retarder layer forward of said resistive touch panel, said second retarder layer has a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits, wherein said resistive touch panel is isotropic and (m+n) is not zero.

Another embodiment comprise a touch panel integrated liquid crystal display comprising: a liquid crystal cell configured to modulate light defining vertical and horizontal axes, said liquid crystal cell comprising a liquid crystal layer sandwiched between two sheets of transparent electrodes; a first linear polarizer forward said liquid crystal cell, said first linear polarizer having a first linear polarization axis; a first quarter wave retarder forward said first linear polarizer, said quarter wave retarder having a first slow axis; a resistive touch panel forward said first quarter wave retarder; a second quarter wave retarder forward said resistive touch panel, said quarter wave retarder having a second slow axis and a rear surface through which incident light passes; a second linear polarizer forward said second quarter wave retarder, said second linear polarizer oriented relative to said second quarter wave retarder such that said incident light which passes said rear surface of said second quarter wave retarder has a substantially circular polarization; and a display front surface through which said modulated light exits, wherein said second slow axis of said second quarter wave retarder is oriented at an angle other than about 0° or 90° with respect to said horizontal axis and other than at about 90° with respect to said first slow axis of said first quarter wave retarder.

Another embodiment of the invention comprises a polarized touch panel comprises: a resistive touch panel module defining the vertical and horizontal axes; a first quarter wave retarder forward said touch panel module, said first quarter wave retarder having a first slow axis; a second quarter wave retarder rearward said resistive touch panel module, said second quarter wave retarder having a second slow axis which is oriented at about 0° or 90° with respect to said horizontal axis; a linear polarizer forward said first quarter wave retarder, said linear polarizer having a linear polarization axis; and a display front surface through which modulated light of a display exits, wherein said first slow axis of said first quarter wave retarder is oriented at an angle other than about 90° with respect to said horizontal axis and other than about 90° relative to said second slow axis of said second quarter wave retarder.

Another embodiment of the invention comprises a polarized touch panel comprising: a resistive touch panel module defining the vertical and horizontal axes; a first retarder layer forward said touch panel module, said first retarder layer having a retardance of about $(2n+1)\lambda/4$ and a first slow axis, where n is an integer and $\lambda$ is 400 nm to 700 nm; a linear polarizer forward said first retarder layer, said linear polarizer having a linear polarization axis; a second retarder layer forward said linear polarizer; and a display front surface through which modulated light of a display exits, wherein said slow axis of said first retarder layer is set at an angle of about ±45° relative to said linear polarization axis of said linear polarizer.

Another embodiment of the invention comprises a reflective functional part integrated display comprising: a liquid crystal cell configured to modulate light defining vertical and horizontal axes, said liquid crystal cell comprising a liquid crystal layer sandwiched between two sheets; a partial reflector rearward said liquid crystal layer; a first linear polarizer forward said liquid crystal cell, said first linear polarizer having a front surface and a first linear polarization axis; a first retarder layer forward said first linear polarizer, said first retarder layer having a front surface, a rear surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter, and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated display comprising: a liquid crystal cell configured to modulate light defining vertical and horizontal axes, said liquid crystal cell having a front surface and comprising a liquid crystal layer sandwiched between two sheets; a partial reflector rearward said liquid crystal cell; said partial reflector comprising a reflective polarizer having a first linear polarizing axis; a first retarder layer forward said liquid crystal cell, said first retarder layer having a front surface, a rear surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated transflective display comprising: a liquid crystal cell configured to modulate light defining vertical and horizontal axes, said liquid crystal cell having a front surface and comprising a liquid crystal layer sandwiched between two sheets; a first linear polarizer rearward said liquid crystal cell, said first linear polarizer having a rear surface and a first linear polarization axis; a partial reflector rearward said first linear polarizer; a first retarder layer forward said liquid crystal cell, said first retarder layer having a front surface, a rear surface, a retardance of about $(2n+1)\lambda/4$, and a first slow axis which forms an angle $\theta_1$ to said first linear polarization axis, where n is an integer and $\lambda$ is between about 400 nm to 700 nm; a reflective functional part forward of said first retarder layer, said reflective functional part having a rear surface and comprising at least one of a resistive touch panel, an EMI shield, an infrared filter, and an LCD heater; a second retarder layer forward of said reflective functional part, said second retarder layer having a second slow axis and a retardance of about $(2m+1)\lambda/4$, where m is an integer and $\lambda$ is between about 400 nm to 700 nm; a second linear polarizer forward said second retarder layer, said second linear polarizer having a second polarization axis, which forms an angle $\theta_2$ to said second slow axis of said second retarder layer; and a display front surface through which said modulated light exits.

Another embodiment of the invention comprises a reflective functional part integrated transflective display comprising: a transflective liquid crystal display module having a module front surface that selectively outputs linearly polarized light oriented along a first linear polarization axis, said liquid crystal display module comprising a liquid crystal cell, a partial reflector, and a backlight module; a first retarder layer forward said liquid crystal display module, said first retarder layer having a front surface, a rear surface, a retardance of about $(2n+1)\lambda/4$, and a first slow axis, which forms an angle $\theta_1$ to said first linear polarization axis, where n is an integer and $\lambda$ is between about 400 nm to 700 nm; a reflective functional part forward said first retarder layer, said reflective functional part having a rear surface; a second retarder layer forward said reflective functional part, said second retarder layer having a second slow axis and a retardance of about (2m+1)λ/4, where m is an integer and λ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from said backlight module exits. In some embodiment, said reflective functional part comprises at least one of a resistive touch panel, an EMI shield, an infrared filter, and an LCD heater.

Another embodiment of the invention comprises a reflective functional part integrated transflective display comprising: a liquid crystal display module having a module front surface, said liquid crystal display module comprising, from front to rear, a liquid crystal cell, a partial reflector comprising a reflective polarizer having a first linear polarization axis, and a light module; a first retarder layer forward said liquid crystal display module, said first retarder layer having a front surface, a rear surface, a retardance of about (2n+1)λ/4, and a first slow axis, which forms an angle $\theta_1$ to said first linear polarization axis, where n is an integer and λ is between about 400 nm to 700 nm; a reflective functional part forward said first retarder layer, said reflective functional part having a rear surface; a second retarder layer forward said reflective functional part, said second retarder layer having a second slow axis and a retardance of about (2m+1)λ/4, where m is an integer and λ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from the light module exits. In some embodiment, said reflective functional part comprises at least one of a resistive touch panel, an EMI shield, an infrared filter, and an LCD heater.

Another embodiment of the invention comprises a reflective functional part integrated display comprising: a liquid crystal display module having a module front surface that selectively outputs linearly polarized light oriented along a first linear polarization axis, said liquid crystal display module comprising, from front to rear, a liquid crystal cell, and a light module; a reflective functional part forward said liquid crystal display module, said reflective functional part having a rear surface; a second retarder layer forward said reflective functional part, said second retarder layer having a second slow axis and a retardance of about (2m+1)λ/4, where m is an integer and λ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light from said light module exits, wherein said liquid crystal display module front surface includes at least one of an anti-reflection treatment and a diffusing structure. In certain embodiments anti-reflection treatment comprises a multi-layer AR coating or a laminated sheet member with AR coating. In some embodiment, said reflective functional part comprises at least one of a resistive touch panel, an EMI shield, an infrared filter, and an LCD heater.

Another embodiment of the invention comprises a reflective functional part integrated display comprising: a liquid crystal display module having a module front surface that selectively outputs linearly polarized light oriented along a first linear polarization axis, said liquid crystal display module comprising, from front to rear, a liquid crystal cell and a light module; a first retarder layer forward said liquid crystal display module, said first retarder layer having a front surface, a retardance of about (2n+1)λ/4, and a first slow axis which forms an angle $\theta_1$ to said first linear polarization axis, where n is an integer and λ is between about 400 nm to 700 nm; a reflective functional part forward said first retarder layer, said reflective functional part having a rear surface; a second retarder layer forward of said reflective functional part, said second retarder layer having a second slow axis and a retardance of about (2m+1)λ/4, where m is an integer and λ is between about 400 nm to 700 nm; a second linear polarizer forward said second retarder layer, said second linear polarizer having a second polarization axis, which forms an angle $\theta_2$ to said second slow axis of said second retarder layer; and a display front surface through which light exits, wherein at least one of said first retarder layer front surface and said reflective functional part rear surface includes at least one of an anti-reflection treatment and a diffusing structure. In certain embodiments the anti-reflection treatment comprising a multi-layer AR coating or a laminated sheet member with AR coating. In some embodiment, said reflective functional part comprises at least one of a resistive touch panel, an EMI shield, an infrared filter, and an LCD heater.

Another embodiment of the invention comprises a polarizing liquid crystal display protection panel having a protection panel rear surface and a protection panel front surface through which light from a display module may pass and exit to a viewer, said protection panel comprising: a retarder layer RB having a front surface, a rear surface, a slow axis RBX, and a retardance of about (2m+1)λ/4, where m is an integer and λ is between about 400 nm to 700 nm; a linear polarizer PB forward said retarder layer RB and closer to the viewer, said linear polarizer PB having a linear polarization axis PBX that forms an angle $\theta_2$ of about 45° or −45° to said slow axis RBX of said retarder layer RB; and a transparent supportive panel, said transparent supportive panel comprises a sheet of glass substrate, a sheet of plastic substrate, or a touch input device, wherein at least one of said panel front and rear surfaces comprises an anti-reflection treatment.

Another embodiment of the invention comprises a polarizing protection panel liquid crystal display integral comprising: a liquid crystal display module having a module front surface that selectively outputs linearly polarized light oriented along a linear polarization axis PAX, said liquid crystal display module comprising a backlight module and a liquid crystal cell having a liquid crystal layer sandwiched between two transparent substrates; a polarizing protection panel forward said liquid crystal display module, said polarizing protection panel has a protection panel rear surface and a protection panel front surface and comprises a transparent supportive panel and a linear polarizer PB with a linear polarization axis PBX that is positioned either forward or rearward said transparent supportive panel; and a display front surface through which light from said backlight module exits, wherein said transparent supportive panel of said protection panel comprises a sheet of glass substrate, a sheet of plastic substrate, or a touch input device and at least one of said display front surface, said protection panel rear surface, and said module front surface comprises an anti-reflection treatment.

Another embodiment of the invention comprises a polarizing protection panel transflective liquid crystal display integral comprising: a transflective liquid crystal display module having a module front surface that selectively outputs linearly polarized light oriented along a linear polarization axis PAX, said transflective liquid crystal display module comprising a liquid crystal cell having a liquid crystal layer sandwiched between two transparent substrates, a partial reflector comprising a reflective electrode or reflective sheet member, and a backlight module; a retarder layer RA forward said transflective liquid crystal display module, said retarder layer RA having a front surface, a rear surface, a retardance of about $(2n+1)\lambda/4$, and a first slow axis, which forms an angle $\theta_1$ to said linear polarization axis PAX, where n is an integer and $\lambda$ is between about 400 nm to 700 nm; a polarizing protection panel forward said liquid crystal display module, said protection panel having a protection panel rear surface and a protection panel front surface and comprising a transparent supportive panel, a retarder layer RB having a slow axis RBX with a retardance of about $(2m+1)\lambda/4$, where m is an integer and $\lambda$ is between about 400 nm to 700 nm, and a linear polarizer PB having a linear polarization axis PBX, which forms an angle $\theta_2$ to said slow axis RBX; and a display front surface through which light from said backlight module exits, wherein said linear polarizer PB of said protection panel is disposed at the front side of said retarder layer RB of said protection panel and said transparent supportive panel of said protection panel comprises a sheet of glass substrate, a sheet of plastic substrate, or a touch input device and is positioned forward said linear polarizer PB, rearward said retarder layer RB, or between said linear polarizer PB and said retarder layer RB.

Another embodiment of the invention comprises a polarizing protection panel transflective liquid crystal display integral comprising: a transflective liquid crystal display module having a module front surface, said transflective liquid crystal display module comprising, from front to rear, a linear polarizer PA having a linear polarization axis PAX, a liquid crystal cell having a liquid crystal layer sandwiched between two transparent substrates, a partial reflector comprising reflective electrode or reflective sheet members, and a backlight module; a retarder layer RA forward said transflective liquid crystal display module, said retarder layer RA having a front surface, a rear surface, a retardance of about $(2n+1)\lambda/4$, and a first slow axis, which forms an angle $\theta_1$ to said linear polarization axis PAX, where n is an integer and $\lambda$ is between about 400 nm to 700 nm; a polarizing protection panel forward said liquid crystal display module, said protection panel having a protection panel rear surface and a protection panel front surface and comprising a transparent supportive panel, a retarder layer RB having a slow axis RBX with a retardance of about $(2m+1)\lambda/4$, where m is an integer and $\lambda$ is between about 400 nm to 700 nm, and a linear polarizer PB having a linear polarization axis PBX, which forms an angle $\theta_2$ to said slow axis RBX; and a display front surface through which light from said backlight module exits, wherein said linear polarizer PB of said protection panel is at the front side of said retarder layer RB of said protection panel and said transparent supportive panel of said protection panel comprises a sheet of glass substrate, a sheet of plastic substrate, or a type of touch input device and is positioned forward said linear polarizer PB, rearward said retarder layer RB, or between said linear polarizer PB and said retarder layer RB.

BRIEF DESCRIPTION OF THE DRAWINGS

FIGS. 1A and 1B are schematic diagrams used in the discussion of retarders and polarization conversion.

FIGS. 1C-1H are schematic diagrams illustrating conversion of a linearly polarized light wave into circular polarization using a retarder layer comprising various retardation plates.

FIGS. 6A-6C are schematic diagrams showing the effect of viewing direction on the apparent brightness of an NLP-LCD to a viewer wearing polarized sunglasses.

FIG. 7A is a schematic diagram of the apparent brightness of various viewing zones for a conventional LCD or an LCD integrated together with a polarized touch screen that produces linearly polarized light.

FIG. 7B is a schematic diagram showing the apparent brightness of various viewing zones for the NLP-LCD 200 which outputs circularly polarized light to viewers wearing polarized sunglasses.

FIGS. 14A-14C are schematic illustrations showing how reflections from functional parts are reduced by the second circularly polarizing retarder.

FIG. 16A is a schematic cross-sectional view of a LCD display 1500 configuration of FIG. 15A showing a first circularly polarizing plate formed from a first retarder layer, a liquid crystal cell, and a first linear polarizer.

FIG. 16B is a perspective view of the LCD display 1600 configuration of FIG. 16A showing a first circularly polarizing plate formed from a first retarder layer, a liquid crystal cell, and a first linear polarizer.

FIG. 16C is a front view of the LCD display 1600 configuration of FIG. 16B showing the first retarder layer, the liquid crystal cell, and the first linear polarizer arranged to produce left-handed circularly polarized light.

FIG. 16D is a front view of the LCD display 1600 configuration of FIG. 16B showing the first retarder layer, the liquid crystal cell, and the first linear polarizer arranged to produce right-handed circularly polarized light.

DETAILED DESCRIPTION OF CERTAIN EMBODIMENTS

Figure 2:
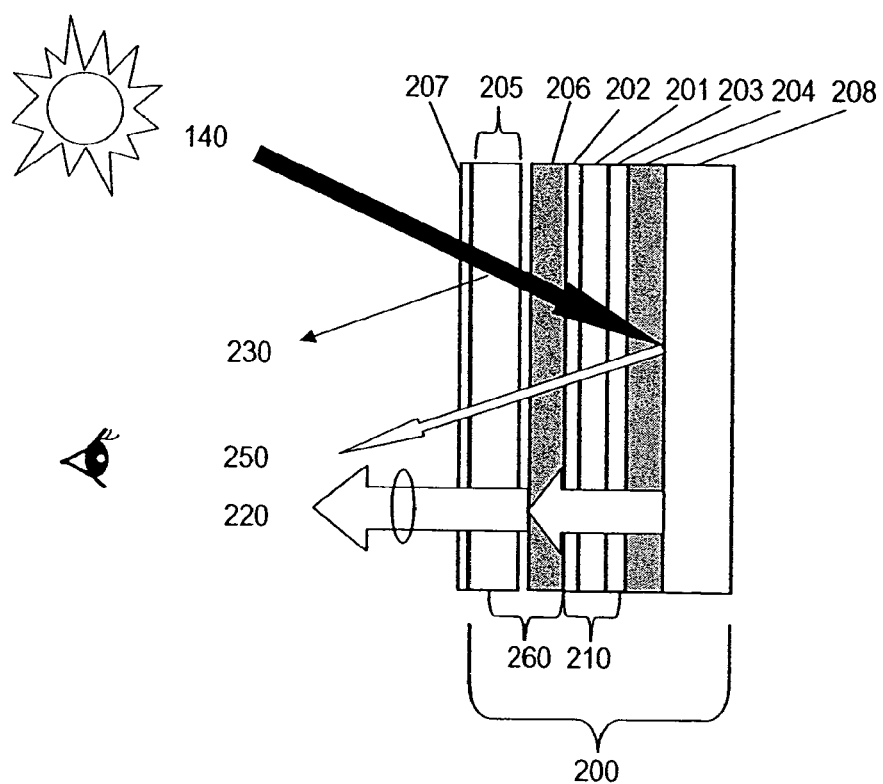
FIG. 2 is a schematic cross-sectional view of a liquid crystal display having non-linearly polarized output.

A retardation plate is a birefringent optical element, in which light propagating longitudinally in a z-axis direction travels with different velocities for different polarizations oriented along orthogonal x and y axes. Thus, the light wave may have orthogonal polarization components, one of which is retarded relative to the other, by an amount that may be expressed as a retardance, R. The retardance R is determined by $d(N_s-N_f)$, wherein $N_s$ is the refractive index of the slow axis of the retardation plate, $N_f$ is the fast axis of the retardation plate, and d is the physical thickness of the plate. A retardation plate with retardance, R, will cause a phase difference of $2\pi R/\lambda$ between the orthogonal polarizations of a light wave that passes therethrough. Thus, when the angle between the linear polarization axis of the incident light beam and the slow axis of a quarter wave plate (where $R=\lambda/4$) is at about 45 degrees, a phase difference of $2\pi R/\lambda=90°$ between the orthogonal polarizations of the incident light beam results. Hence, the linearly polarized light wave is converted into a circularly polarized light wave with rotation directions either clockwise or counterclockwise. If the retardance is other than $(2n+1)\lambda/4$, where n is an integer, or the slow axis of a quarter wave plate and the linear polarization axis of the incident light beam are at angles other than 45 degrees, elliptically polarized light is produced. An integer is defined herein as including the values ... −2, −1, 0, 1, 2 ....

A linearly polarized light wave can be transformed into circularly polarized light by using various retarder layers comprising one or more retarder plates in proper arrangement. To facilitate the discussion below, quarter wave plates, half wave plates, and full wave plates will be used as examples. In FIG. 1A, a quarter wave plate 102 is shown with a slow axis indicated as a dotted line. FIG. 1A also shows a half wave plate 103 and a full wave plate 104 with a slow axis indicated as a dotted line. A linear polarizer 105 is shown with a polarization axis indicated as the double-headed arrow. Linearly polarized light 106 is shown with the polarization also indicated as the double-headed arrow. Right-handed circularly polarized light 107 is shown as a circle with an arrow going clockwise. Left-handed circularly polarized light 108 is shown as a circle with an arrow going counterclockwise.

Although the term plate is used in describing retarders herein, retarders may comprise a thin or thick film, a layer, a sheet, or a plate, having varying degrees of thickness, rigidity, and other optical and non-optical properties. Reference to a retarder plate is thus not limiting as the retarder may likewise comprise a film, layer, sheet or other medium that introduces retardance. Similarly, the film, layer, sheet, or plate may comprise multiple portions itself. Accordingly, layers are described as comprising plates but may otherwise comprise sublayers comprising films, sheets, etc.

As illustrated in FIG. 1B, a retarder layer comprising quarter wave plates, half wave plates, or full wave plates with various orientations of slow axes will result in different "effective retardances". For example, retarder layer 110, comprising two quarter wave plates with perpendicular slow axes as shown, has an effective retardance equivalent to 0. Retarder layer 120 comprising a full wave plate and two quarter wave plates having perpendicular slow axes as shown, has an effective retardance equivalent to a full wave plate. Additionally, retarder layer 130, comprising a full wave plate and a half wave plate as shown, has an effective equivalent to a half wave plate with slow axis being horizontal.

FIGS. 1C-1H show a plurality of retarder arrangements 140, 150, 160, 170, 180, and 190 comprising combinations of retardation plates having their relative orientations varied as indicated. The polarization axis of the linearly polarized light 106 incident on the slow axis of retardation plate 102 is at about 45°. Each of the retarder layers shown contains an odd number of equivalent quarter wave plates with slow axis as shown in each arrangement. For example, the arrangement 140 in FIG. 1C is equivalent to a single quarter plate having a slow axis in the vertical direction. For example, the arrangement 150 in FIG. 1D is equivalent to a three quarter plates having a slow axis in the vertical direction, etc. Though having different effective retardances, each arrangement invariably circularly polarizes the linear polarization 106 producing either clockwise or counterclockwise circularly polarized light.

Although not shown, there are many other combinations of retarder layers having an effective retardance of $(2n+1)\lambda/4$, where n is an integer (e.g., ... −2, −1, 0, 1, 2 ... ) and $\lambda/4$ is between about 400 nm-700 nm, which produce either clockwise (right-handed), or counterclockwise (left-handed) circularly polarized light. In some embodiments, the retardation plates comprising the retarder layer can be loosely stacked or laminated. As described above, these layers may comprise sublayers comprising different layers of film. It is also applicable to manufacture a single thick sheet retarder, which has $(2n+1)\lambda/4$ equivalent retardance and which circularly polarizes a linearly polarized light like a single quarter wave plate. A thick film may also be deposited. Thus, "a retarder layer" having $(2n+1)\lambda/4$ retardance, comprised of a single sheet retarder or a thick film, or a stack of laminated or loose sheets or other sublayers comprising quarter wave plates, half wave plates, or full wave plates, would have a "collective" slow axis and a "collective" fast axis that functions similarly to the slow and fast axes of a single quarter wave plate. Such a retarder layer will be termed as "quarter wave retarder." As discussed above, an incident angle other than 45° or −45° (and 0° and 90°) between the polarization axis of linearly polarized light and the slow axis of a quarter wave retarder will result in elliptically polarized light. Passing light through a retarder layer with retardance other than about $(2n+1)\lambda/4$ also results in elliptically polarized light.

Referring now to FIG. 2, a liquid crystal display having non-linearly polarized light output, abbreviated as NLP-LCD hereafter, is shown. The NLP-LCD 200 includes, with viewer's side as the front side, a liquid crystal cell 210, comprised of a liquid crystal layer 201 sandwiched between a front transparent substrate 202 and a rear transparent substrate 203 containing electrodes. The front substrate 202 can be a thin glass sheet containing transparent electrodes, such as in a transmissive or transflective type of TFT liquid crystal display. The front substrate 202 can also be a thin glass sheet with a stack of transparent retardation compensator plates or layers having a surface coated with transparent electrodes, such as in a reflective, transflective, or transmissive type of TN/STN liquid crystal display. The NLP-LCD 200 can also include a rear polarizer 204 and a backlight module 208 in the rear side of liquid crystal cell 210. The backlight module 208 can be a high efficiency transmissive backlight cell assembly comprising sheets of brightness enhancement films and other polymeric films for enhancing light transmission and optical performances. The backlight module 208 can also be a transflective or reflective type of lighting device. The reflective function can be implemented by reflective electrodes (not shown) deposited on the front surface of the rear substrate 203, or a sheet member with transflective or reflective property (not shown) placed on the rear side of the rear substrate 203. For example, a combination of a diffusing element and a reflective polarizer (not shown) will provide substantially optimized optical performances under the sun, which will be discussed further below. However, embodiments may include any conventional backlight cell or high brightness backlight cell, e.g., with edge or backside lamps.

The NLP-LCD 200 also includes a first linear polarizer 206 bonded to the front surface of the liquid crystal cell 210. The NLP-LCD 200 further comprises a first retarder layer 205, for example, a quarter wave retarder having a retardance of about $(2n+1)\lambda/4$ where n is an integer and $\lambda$ is between about 400 nm-700 nm, forward of the first linear polarizer 206. The first retarder layer 205 has a front surface 207, e.g., with a haze value less than about 30%. The low haze value of the surface is useful for reducing the specular reflections for clear outdoor visibility. The front surface 207 can be a highly efficient multilayer anti-reflection coating, for example, having reflection less than about 1.5%, to reduce the surface reflection 230 and to maximize the entry of light beam 140 for reflective illumination 250. The front surface 207 can further be a separate transmissive substrate or layer comprising, e.g., glass or plastic, such as PET, PEN, TAC, PC, ARTON, etc., having its low haze front surface coated with the high efficient multilayer anti-reflection coating, for example, having reflection less than about 1.5%, and with its rear surface being laminated to or coated on the front surface of the first retarder layer 205 with index matching pressure sensitive adhesive (PSA). In other embodiments, the front surface 207 may comprise a retarder or a thin film coating or multilayer disposed thereon. Still other configurations are possible (for example, the anti-reflective coating may be located elsewhere).

Figure 3:
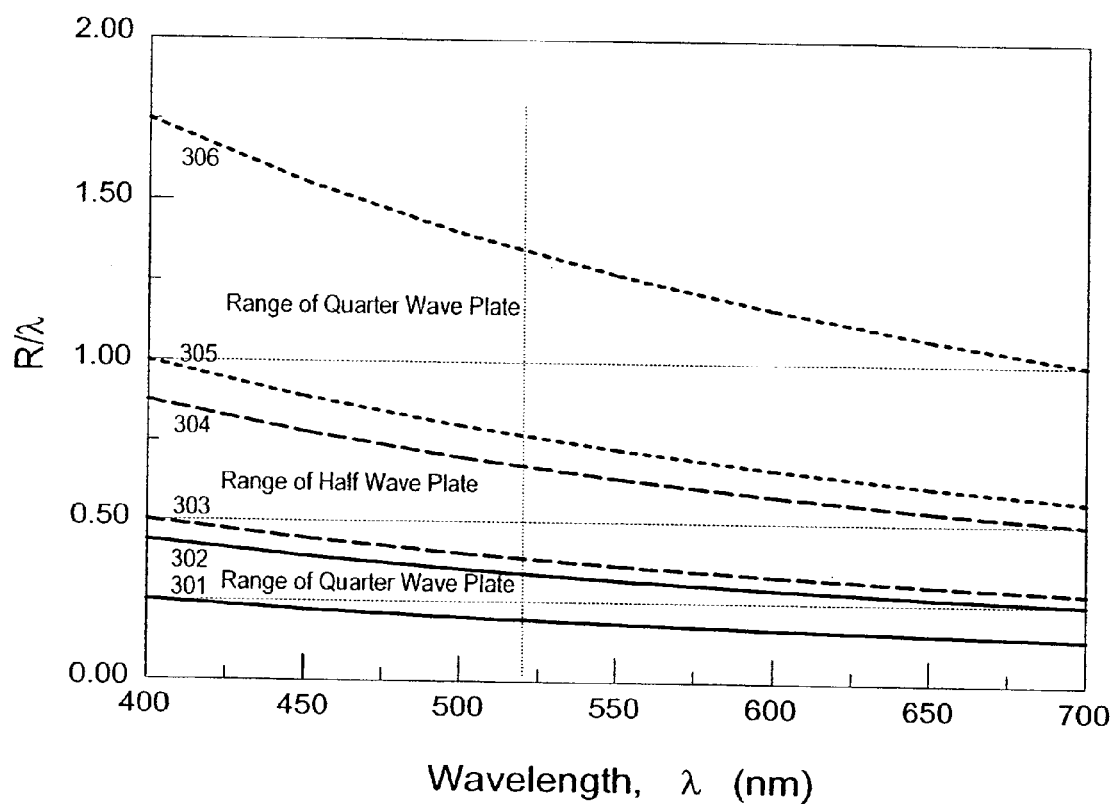
FIG. 3 is a plot on axes of retardance in waves ($R/\lambda$) versus wavelength showing the dispersion effect and the range of wave plate retardation.

The first retarder layer 205 may be a single sheet retarder or a stack of laminated or loose sheets or may be a film or multiple films. This first retarder layer may comprise various combinations of retarder plates or layers or sublayers, e.g., quarter wave plates, half wave plates, or full wave plates as previously discussed. A quarter wave plate with $R/\lambda=0.25$, where $\lambda$ is the wavelength in the visible light region, would be a particularly suitable retardation plate for the application. However, a perfect quarter wave plate with $R/\lambda=0.25$ is difficult to make due to the dispersion effect, as shown in FIG. 3. Thus, quarter wave plates with $R/\lambda$ values in the range between curves 301 and 302, as shown in FIG. 3, can be used. For example, a quarter wave plate having a $R/\lambda$ value between about 0.216 and 0.315 at wavelength about 520 nm can be used. Similarly, embodiments may include half wave plates with $R/\lambda$ values in the range between curves 303 and 304, as shown in FIG. 3. For example, a half wave plate having an $R/\lambda$ value between about 0.432 and 0.630 at a wavelength of about 520 nm may be employed. Embodiments may include a full wave plate have an $R/\lambda$ value in the range between curves 305 and 306, as shown in FIG. 3. A full wave plate having, for example, an $R/\lambda$ value between about 0.864 and 1.260 at wavelength about 520 nm may be used. Values outside these ranges are also possible. The rear surface of the first retarder layer 205 can be laminated to the front surface of the first linear polarizer 206 with an index-matched pressure sensitive adhesive (PSA) to form a first circularly polarizing retarder 260 as a part of the display.

FIGS. 4A and 4B show diagrams of configurations 410 and 420 comprising the first retarder layer 205 and the first linear polarizer 206 that produce left-handed and right-handed circularly polarized light, respectively. As discussed above with reference to FIG. 1, the first retarder layer 205 has an optical slow axis 401 and an optical fast axis 402 and operates as a single quarter wave plate. The first linear polarizer 206 has a polarization axis 403. Viewed from the front side of the retarder layer looking towards the LCD light source 208, the configuration of the first retarder layer 205 and the first linear polarizer 206 can be defined by the angle, $\theta_1$, between the slow axis 401 of the first retarder layer 205 and the polarization axis 403 of the first linear polarizer 206. As generally defined, angle $\theta_1$ has a positive value, if it increases from the slow axis 401 of the first retarder layer counterclockwise to the polarization axis 403 of the first linear polarizer 206. On the other hand, $\theta_1$ has a negative value, if it increases from the slow axis 401 of the first retarder layer 205 clockwise to the polarization axis 403 of the first linear polarizer 206.

Projections of two different configurations 410 and 420 between the first retarder layer 205 and the first linear polarizer 206 are shown in FIGS. 4A and 4B, respectively. In configuration 410 in FIG. 4A, in which $\theta_1$ is substantially 45°, light 220 emitted by the LCD is transformed into a counterclockwise circularly polarized light wave 404, which is a left-handed circular polarization by definition. The circularly polarizing retarder 260, comprising the first retarder layer 205 and the first linear polarizer 206, is thus said to have a left-handed circular polarization configuration. Likewise, as shown in configuration 420 in FIG. 2B, in which $\theta_1$ is substantially −45°, light 220 emitted by the LCD is transformed into a clockwise circularly polarized light wave 405, which is a right-handed circular polarization by definition. The circularly polarizing retarder 260 is said to have a right-handed circular polarization configuration. Angles other than −45° or 45° (and 0° and 90°) cause the emitted light to have elliptical polarization.

Referring now back to FIG. 2, by suitably disposing the first retarder layer 205 in relation to the linear polarizer 206, the NLP-LCD 200 emits a non-linearly polarized light 220—for example, an elliptical or a circularly polarized light depending on how the first retarder 205 and the first linear polarizer 206 are oriented. Though being elliptically or circularly polarized, the illumination intensity of the NLP-LCD 200 is substantially maintained and the optical performance of the NLP-LCD performs at least as well as a conventional linearly polarized light emitting LCD. The advantage of having a circularly polarized illumination, for example, in enhancing displays performance for wearer's of polarized sunglasses is discussed in further detail below.

FIGS. 5A-5D are diagrams schematically illustrating the effect of viewing direction on the apparent brightness of a conventional LCD or a conventional polarized touch screen to a viewer wearing polarized sunglasses. Usually, the light polarization direction of a liquid crystal display is determined by the orientation of the polarization axis of the linear polarizer disposed forward of the liquid crystal cell, which is described with respect to display modulator. Directions of 0° (horizontal) and 90° (vertical) in a landscape and a portrait view of a display module (or a touch panel module) are shown in 510 and 520 in FIG. 5A. The polarization direction of a conventional TFT LCD or a polarized touch panel is typically 45° or 135°, and substantially 0° in some larger size LCDs. Polarized sunglasses usually have a vertical transmission in order to block out the strong horizontally polarized scattered/reflected sunlight. Depending on the viewing position of a viewer 501 wearing polarized sunglasses, the polarization direction 502 light from the LCD or touch panel, e.g. 45° in FIGS. 5B-5C, forms an angle $\theta$ with the transmission direction 503 of the polarized sunglasses, which is always vertical to viewer's eyes. Hence the apparent brightness of the LCD to the viewer will bear a factor of $\cos\theta$ to the actual brightness of LCD. Thus, when the viewer is in the most common straight front viewing position shown in 530 in FIG. 5B, $\theta$ is in about 45°, and approximately half of the LCD brightness will be seen by viewer. When the viewer moves to his or her left side, as shown in 540 in FIG. 5C, θ is about 0° and cos 0° equals to 1, so most light from the LCD will be seen. When the viewer moves to his or her right side, as shown in 550, θ is about 90° and since cos 90° equals to 0, little of the LCD light is seen from this viewing position.

FIGS. 6A-6C show the effect of viewing direction on the apparent brightness of the NLP-LCD 200 to a viewer wearing polarized sunglasses. The light from the NLP-LCD 200 is circularly polarized to be either left-handed or right-handed. The viewer is indicated by 501 and the transmission direction of the polarized sunglasses is indicated as 503. The circularly polarized LCD light is indicated as 602, which is right-handed in this illustration. When the viewer 501 is in the front position 610, the relationship of the circularly polarized light 602 to the transmission direction of polarized sunglasses 503 is shown in 640. About one half of the circularly polarized light is selectively passed by the polarized sunglasses. When the viewer 501 moves to the left 620 as shown in FIG. 6B, the relationship of the circularly polarized light 602 to the transmission direction of polarized sunglasses 503 is shown in 650. Again, about one half of the circularly polarized light is selectively passed by the polarized sunglasses. When viewer moves to the right 630 as shown in FIG. 6C, the relationship of the circularly polarized light 602 to the transmission direction of polarized sunglasses 503 is shown in 660. About one half of the circularly polarized light is again selectively passed by the polarized sunglasses. Thus, in substantially all viewing positions of the NLP-LCD 200, about one half of the LCD brightness is visible to a viewer wearing polarized sunglasses.

FIG. 7A shows a diagram of the apparent brightness of various viewing zones for a conventional LCD or an LCD integrated together with a polarized touch screen that produces linearly polarized light. As discussed below with reference to FIGS. 5A-5C, a conventional LCD or a regular polarized touch panel integrated LCD with linearly polarized light appears black to viewers wearing polarized sunglasses either in zones 701, zones 702, or zones 703 depending on whether the light transmission direction is 135°, 45°, or 0°, respectively.

FIG. 7B shows the apparent brightness of various viewing zones for the NLP-LCD 200 which outputs circularly polarized light to viewers wearing polarized sunglasses. Discussions in connection with FIGS. 6A-6C demonstrate that the NLP-LCD 200 with circularly polarized light has a superior optical property for outdoor applications, as it can deliver consistent brightness in viewing zones all around NLP-LCD to viewers wearing polarized glasses regardless viewer's viewing positions. Thus, NLP-LCD 200 has advantage of a conventional LCD yet it offers substantially consistent brightness in all viewing directions to viewer wearing polarized sunglasses. A more convenient and comfortable visual experiences is provided compared to a conventional LCD. Although a circular polarization output by the NLP-LCD 200 is given as an example to illustrate the advantage of providing a liquid crystal display having a non-linearly polarized light over the conventional liquid crystal display with linearly polarized light, it is possible to have a liquid crystal display with elliptically polarized light and still provide improvement by mitigating the effect of the dark zones for viewers wearing polarized sunglasses.

In various embodiment, convenient viewing zones of a display are achieved by converting the light polarization direction output by the display to 90 degrees. The advantages of such an arrangement is discussed more fully below.

Figure 8:
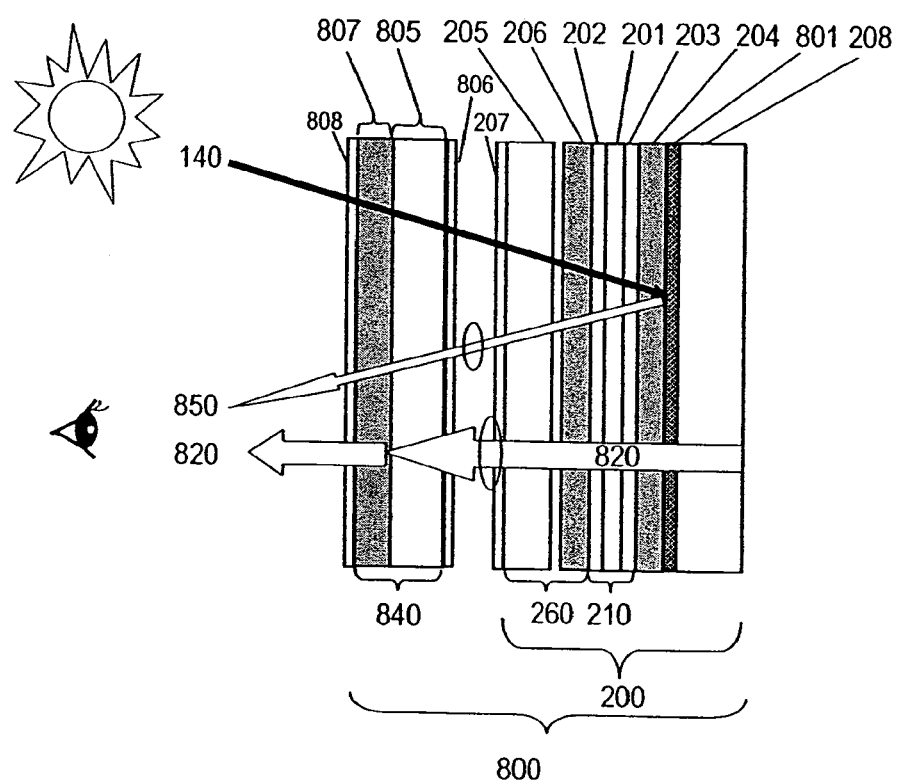
FIG. 8 is a schematic cross-sectional diagram of an NLP-LCD shell structure comprising first and second circularly polarizers that produces linearly polarized light, e.g., having a polarization direction of 90°.

Referring now to FIG. 8, a diagram of an exemplary NLP-LCD shell structure 800 is shown. The NLP-LCD structure 800 comprises, a front side facing the viewer, an NLP-LCD 200 (see FIG. 2) with a transflective sheet 801, a second retarder layer 805 having a rear surface 806 forward of the first retarder layer 205, and a second linear polarizer 807 forward of the second retarder layer 805. In certain preferred embodiments, the second retarder layer 805 is a quarter wave retarder having a retardance of about $(2m+1)\lambda/4$, where m is an integer and $\lambda$ is between about 400 nm-700 nm. This second retarder layer 805 can be, e.g., a single sheet retarder or a stack of laminated or loose sheets or a film or multiple films. Combinations of quarter wave plates, half wave plates, or full wave plates may be used. Quarter wave plates with R/$\lambda$ value in the range, e.g., between curves 301 and 302, as shown in FIG. 3, can be used. For example, a quarter wave plate of R/$\lambda$ value between about 0.216 and 0.315 at wavelength 520 nm may be employed. Half wave plates with R/$\lambda$ value in the range, e.g., between curves 303 and 304 as shown in FIG. 3 can be used. For example, a half wave plate of R/$\lambda$ value between about 0.432 and 0.630 at wavelength about 520 nm may be used. And, full wave plates with R/$\lambda$ value in the range, e.g., between curves 305 and 306 as shown in FIG. 3 can be used. For example, a full wave plate of R/$\lambda$ value between about 0.864 and 1.260 at wavelength about 520 nm may be employed.

The rear surface of the second linear polarizer 807 can be laminated to or formed on the front surface of the second retarder layer 805. The polarization axis of the second linear polarizer 807 may be set substantially at an angle in the range of about)±(25°-65° to the slow axis of the second retarder layer 805, for example, at about ±45° to form the second circularly polarizing plate 840. However, as discussed below, the polarization axis of the second linear polarizer 807 can be conveniently set at an orientation anywhere from 0 to 360° regardless of the orientation of polarization axis of the first linear polarizer 205.

In FIG. 8, a gap is shown between the first and second circularly polarizing retarders 260 and 840. An element such as a touch screen panel, an EMI shield, an IR blocker, or a heater may be disposed in this gap. As discussed more fully below, such elements can introduce substantial backreflections. The second circularly polarizing retarder 840 reduces the reflection from these elements and the first circularly polarizing retarder 260 increases the transmission of LCD light through the second circularly polarizing retarder 840, thereby enhancing the brightness and contrast of the display. How the second circularly polarizing retarder 840 reduces this back reflection and how the first circularly polarizing retarder 260 increases the transmission of LCD light through the second circularly polarizing retarder 840 are discussed more fully below.

To better understand the operation of the first and second circularly polarizing retarders 260 and 840 in the NLP-LCD shell structure, propagation of a light wave through retardation plates between two linear polarizers is discussed with reference to FIGS. 9A-9C. In particular, FIGS. 9A-9C are schematic diagrams of light propagating between two linear polarizers with various retarder layers disposed therebetween. The emitted light beam is marked as 901 and the light propagation direction is indicated as 930.

In arrangement 900 in FIG. 9A, there is only one quarter wave plate 205, with the slow axis indicated with a dotted line, between the two linear polarizers 206 and 807. The first linear polarizer 206 has a polarization axis, which selectively passes incident light 901 as the linearly polarized light wave 902. When light 902 passes the retardation plate 205, it is transformed into circularly polarized light 904, of which about 40~50% is selectively passed by the second linear polarizer 807. Accordingly, arrangements with odd number (2p+1) of quarter wave plates, where p is an integer, between the two linear polarizers 206 and 807 similarly allow at most 40~50% of the incident light 901 to be transmitted through the second linear polarizer 807 as arrangement 900, which is an example of such arrangements with p=0.

In arrangement 910 in FIG. 9B, two retardation plates are placed between linear polarizers 206 and 807. The first retardation plate 205 and the first linear polarizer 206 together form a circularly polarizing retarder 260 having a left-handed configuration. Light 901 is selectively passed by the first linear polarizer 206 and emerges from the first retardation plate 205 as left-handed circularly polarized light 904. The circularly polarized light 904 continues to propagate and pass through the second retardation plate 805, with the slow axis indicated by the dotted line. The light 904 is thereby converted into linearly polarized light 906 with the polarization perpendicular to the linearly polarized light 902. In order to pass the linearly polarized light 906, the polarization axis 911 of the second linear polarizer 807 is perpendicular to the polarization axis of the linear polarizer 206 as shown in arrangement 910. Such an arrangement makes the configuration of the second circularly polarizing plate 840 left-handed, which is the same configuration as the first circularly polarizing retarder 260 comprising the first linear polarizer 206 and first retardation plate 205.

FIG. 9C shows an arrangement 920 comprising four quarter-wave plates 205, 921, 922, and 805 between linear polarizers 206 and 807. Similarly, light wave 901 is circularly polarized after it passes through the first retardation plate 205 and emerges as circularly polarized light 904. The light wave 904 propagates through quarter wave plates 921, 922, and 805, which have their slow axes indicated by the dotted lines, and is converted into linearly polarized light 908. The linearly polarized light 908 has the same polarization as linearly polarized light 902. In order to pass linearly polarized light 908, the second linear polarizer 807 has the polarization axis 923 as shown. This configuration of the second circularly polarizing retarder 840, comprising the second retardation plate 805 and the second linear polarizer 807, is right-handed, which is reverse to the configuration of the first circularly polarizing retarder 260 comprising the first linear polarizer 206 and first retardation plate 205. Although not shown, when there are six quarter wave plates between the two linear polarizers 206 and 807, the configurations of the second and first circularly retarders 260, 840 should be the same (e.g., both left-handed) in order to pass substantial amount of 901.

It can be generalized that in order to have substantial transmission of light wave 901 from the first linear polarizer 206 through the second linear polarizer 807, an even number of quarter wave plates are arranged between two linear polarizers 206 and 807, producing a retardance of about $2p\lambda/4$, where p is a positive integer. In the arrangements shown, the slow axes of the retarder plates are parallel. In certain embodiments, the slow axes of the retarder plates may be arranged with other orientations and result in an effective retardance of $2p\lambda/4$, and still allow the efficient transmission of light 901 through 807. A retarder layer having effective retardance other than $2p\lambda/4$, however, will allow transmission of 901 through 807 with less efficiency.

In addition to efficient transmission of light 901, it is also desirable to have a setup that can effectively prevent reflection of incident light from components in the display system. Illustration 960 in FIG. 9D shows how reflected light is reduced or minimized. As discussed below, if incident light 940 is circularly polarized light 980 when it reaches the reflective surface 950, the back reflection can be blocked.

Thus, the retarder layer 990 forward of the reflective surface 950 may comprise an odd number of quarter wave plates, as discussed in FIG. 1, to produce circularly polarized light from linear polarized light. Likewise, if an even number of quarter wave plates is to be used between the linear polarizers 206 and 807 in the system, these quarter wave plates may be divided into sections forward and rearward of the reflective surface. The arrangement 910 in FIG. 9B shows two retarder layers with odd number of quarter wave plates in each layer, such as $(2m+1)\lambda/4$ and $(2n+1)\lambda/4$, where m and n are integers. The arrangement 910 contains two quarter wave plates, which are divided into two retarder layers, 205, 805 with m=0 and n=0, respectively. Each retarder layer 205, 805 forms with the respective first and second linear polarizers 206, 807, a circularly polarizing retarder 260 and 840 with left-handed configuration. Similarly, in FIG. 9C, arrangement 920 contains four quarter wave plates, which can be divided into two retarder layers using two different approached, with m=1 and n=0, or with m=0 and n=1. In either case, the resultant circularly polarizing retarders 260 and 840 have reverse configurations. Accordingly, It can be generalized that when (m+n) is 0 or an even integer, the configurations of the circularly polarizing retarders 260 and 840 are same with each other; and when (n+m) is an odd integer, the configurations of the circularly polarizing retarders 260 and 840 are reverse to each other.

Referring back to FIG. 8, the NLP-LCD shell structure 800 has two quarter wave plates 205, 805 between the first and second linear polarizers 206 and 807. The propagation of light 820 through the structure 800, therefore, is equivalent to the propagation of 901 in arrangement 910 of FIG. 9B. Accordingly, the configurations of the first and second circularly polarizing retarders 260 and 840 are the same (e.g., both left-handed or both right-handed) in certain preferred embodiments. For example, if the first circularly polarizing retarder 260 is right-handed, the polarization axis of the second linear polarizer 807 is set substantially at −45° to the slow axis of the second retarder layer 805, which makes the second circularly polarizing plate 840 right-handed. And if the first circularly polarizing plate 260 is left handed, the polarization axis of the second linear polarizer 807 is set substantially at 45° to the slow axis of the second retarder layer 805, which makes the second polarizing plate 840 left-handed. In such an arrangement, transmissive illumination 820 and reflective illumination 850 will propagate similarly to the light wave 901 of arrangement 910 in FIG. 9B, and can be efficiently delivered to viewer's eyes.

In certain embodiments, the orientation of the second linear polarizer 807 can be set freely at any angle from 0 to 360 degrees as discussed more fully below. This free rotation of the second linear polarizer can result in a display, e.g., a functional part integrated display, with convenient viewing zones for viewers wearing polarized sunglasses. As shown in FIG. 9B, the second circular retarder 840 can be rotated freely with respect to the first circular retarder 260. The second circular retarder 840 will in each case convert the circularly polarized light wave 904 into linearly polarized light 906. Accordingly, the second polarizer 807 can be oriented at any angle from 0 to 360 degrees.

The result is shown in FIGS. 10A-10D, which are schematic diagrams of the circular polarization generated by various orientations of the second circularly polarizing retarder 840 having a defined configuration of the second retardation plate 805 and the second linear polarizer 807. The NLP-LCD light output, for example, is a left-handed circularly polarized light 1011 in the illustrations. Viewed from the front side of the second linear polarizer looking towards LCD light source, the angle between the polarization axis 1001 of the second linear polarizer 807 to the slow axis 1002 of the second retardation plate 805 is defined as $\theta_2$. If $\theta_2$ increases from the polarization axis 1001 counterclockwise to the slow axis 1002, the angle is positive. On the other hand, if $\theta_2$ increases from the polarization axis 1001 clockwise to the slow axis 1002, the angle is negative. The second circularly polarizing retarder 840 has a left-handed configuration in the case where the transmission 1001 of the second linear polarizer 807 is about 45° with respect to the slow axis 1002 of the second retarder layer 805. The various orientations of the circularly polarizing plate 840 are illustrated as 1003, 1005, 1007 and 1009 in FIGS. 10A-10D, respectively. The circularly polarized light output 1004, 1006, 1008 and 1010 from the NLP-LCD in the illustrated embodiments having the corresponding orientations 1003, 1005, 1007, 1009 are each left-handed. Although not all shown, any rotation of the circularly polarizer 840, in the range of 0° to 360°, would invariably circularly polarize incident light thereby producing left-handed circularly polarized light as long as the configuration of the second linear polarizer 807 and the second retarder layer 805 is substantially maintained. Moreover, the light emitted with left-handed configuration from the rear side of second retarder plate 805 is transmitted by the second linear polarizer 807.

Accordingly embodiments such as shown in FIG. 8 may have the polarization axis of the second linear polarizer 807 set at any orientation from 0 to 360 degree with respect to the polarization axis of the first linear polarizer 206 without compromising transmission efficiency of LCD light. Out of the possible orientations for the polarization axis of the second linear polarizer 807, an orientation of about 90 degree is used in certain preferred embodiments. The advantage of setting the polarization axis at 90° can be understood from the following discussions.

Figure 11:
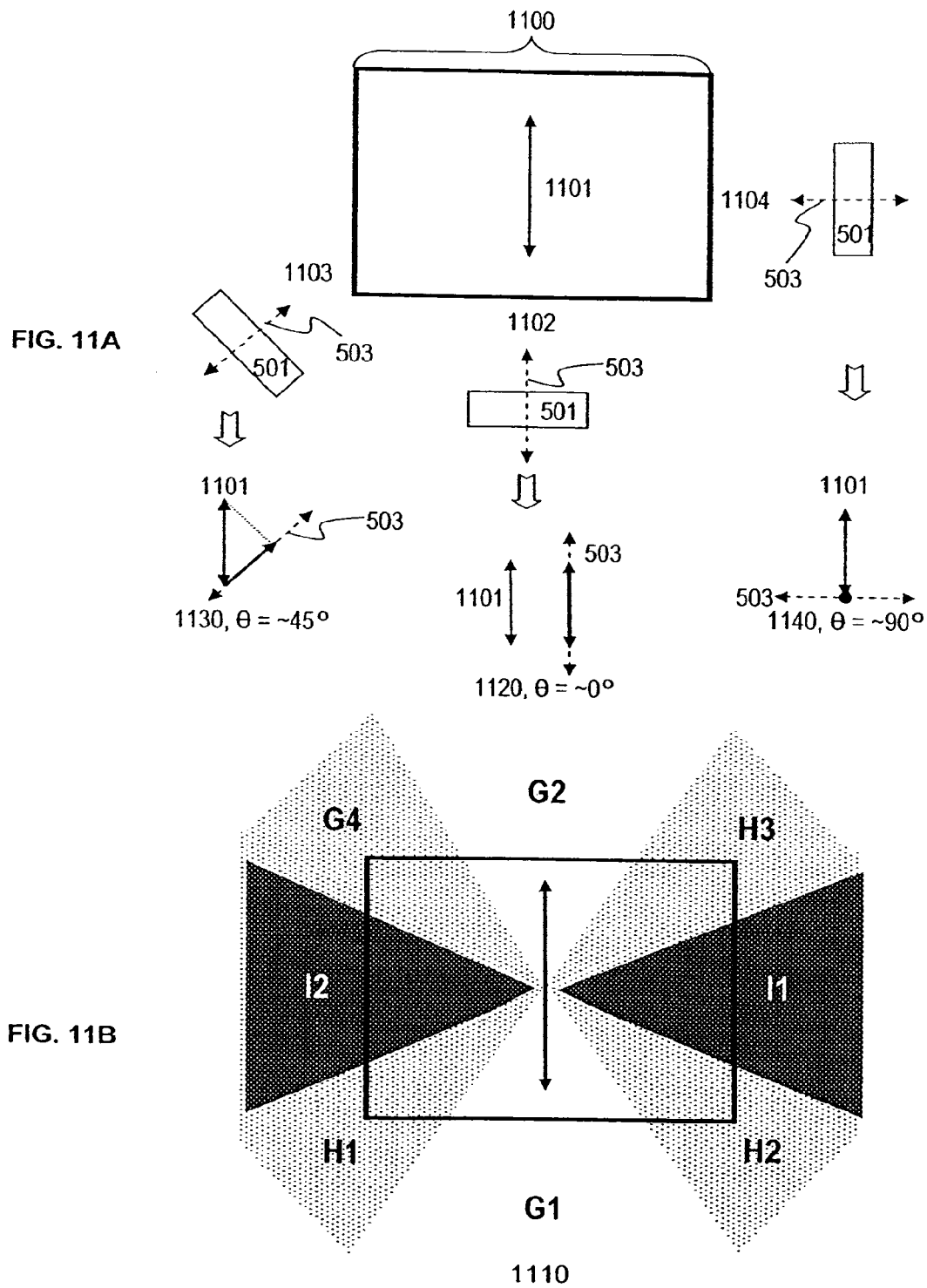
FIGS. 11A and 11B are schematic diagrams illustrating the apparent brightness of the different viewing zones of a display system with 90° polarization axis direction as seen by a viewer wearing polarized sunglasses.

FIGS. 11A and 11B schematically illustrate the apparent brightness as seen by a viewer wearing polarized sunglasses for different viewing zones of a display system that outputs linearly polarized light oriented at about 90° with respect to the horizontal. As shown in FIG. 11A, the display system 1100 has a 90° transmission direction 1101. The transmission direction 1101 forms various angles $\theta$ with the polarization axis 503 of viewer's polarized sunglasses depending to viewer's location. When the viewer 501 is in the most common straight front viewing position 1102, $\theta$ is about 0°, as shown in 1120 where most of LCD brightness will be seen. This area is marked as the bright area G1 in 1110 in FIG. 11B. For the same reason, area G2 is also a full brightness area. However, when viewer 501 moves to his or her left, as shown in 1103 in FIG. 11A, $\theta$ is about 45°, and the LCD will appear about one half as bright, as shown in 1130. This area is marked as the shaded area H1 in 1110 in FIG. 11B. For the same reason, areas H2, H3, and H4, the LCD also would appear to be about half as bright. Only when viewer 501 is at either side of the LCD, such as position 1104 in FIG. 11A, $\theta$ would be about 90° as shown in 1140, and little of the light from the LCD will be seen by the viewer. This area is marked as the dark area I1 in 1110 in FIG. 11B. For the same reason, area I2 would also appear dark. Thus, although with the edge viewing areas I1 and I2 being dark, the display system 1110 with a 90° transmission direction offers much more convenient viewing zones for outdoor viewers wearing polarized sunglasses when it is compared to a conventional display or polarized touch panel that has a light transmission direction of about 45°, 135°, or 0° as shown in FIG. 7.

Accordingly, it is advantageous to set the polarization axis of the second linear polarizer 807 (see FIG. 8) at about 90° for outdoor applications, especially for viewers wearing polarized sunglasses. In some embodiments, depending on the properties of the first and second retardation members 205 and 805 used, color distortion may sometime be observed due to the optical characteristics, such as inhomogeneity in retardation properties, of the retarders. Color correction, however, can be achieved by offsetting either angle $\theta_1$ between the first retarder layer 205 and the first linear polarizer 206 or angle $\theta_2$ between the second linear polarizer 807 and the second retarder layer 805. In various preferred embodiments, for example, the angle $\theta_1$ between the first retarder layer 205 and the first linear polarizer 206 is offset from ±45°. The amount of angle adjustment can be up to about ±20° with respect to ±45°. Similarly the angle $\theta_2$ between the second retarder layer 805 and the second linear polarizer 807 is offset from ±45°. The amount of angle adjustment can be up to about ±20° with respect to ±45°. Alternatively, an even number of quarter wave plates can be introduced between the first and second retarder layers 205 and 805 as color correcting sheets. Other configurations are also possible.

As discussed above, many outdoor electronic applications also might entail the addition of a transparent protection panel or other functional parts comprising highly reflective films, such as EMI shield (EMI), IR block (IR), LCD screen heater (heater), and resistive touch panel (RTP). The following discussions will demonstrate such protection panel and functional parts can readily be incorporated into the shell structure of NLP-LCD 800 (e.g., shown in FIG. 8) and preserve and not introduce significant reflections.

Figure 12A:
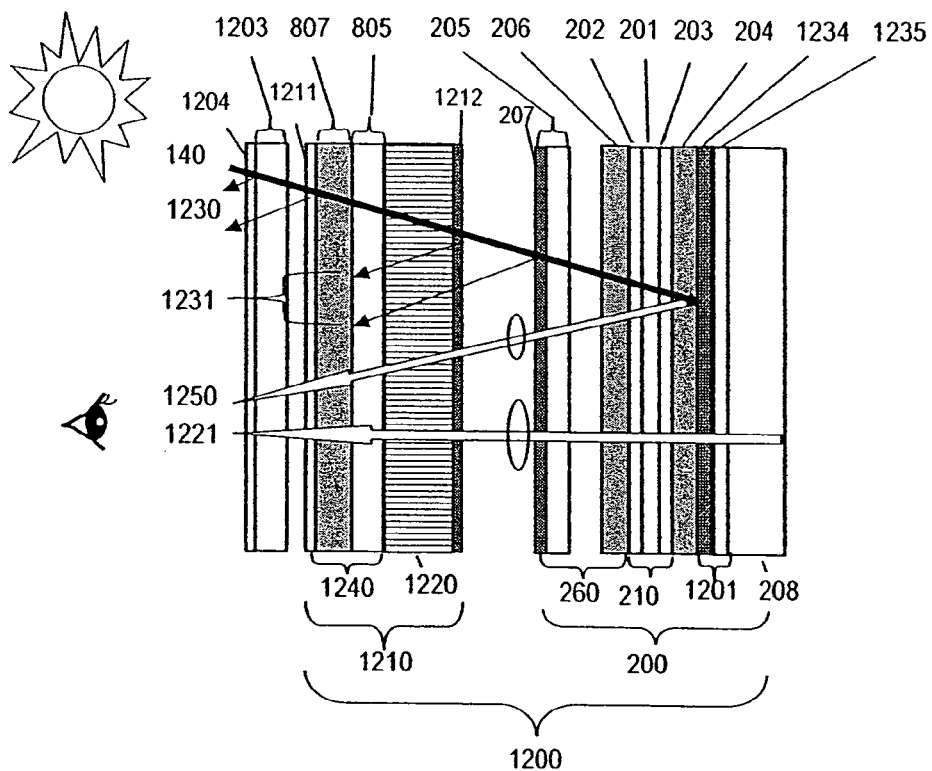
FIGS. 12A-12C are schematic illustrations showing a polarizing transparent protection panel integrated together with a liquid crystal display with or without incorporation of other functional parts.

FIG. 12A shows a polarizing transparent protection panel integrated together with a liquid crystal display with or without incorporation of other functional parts. The polarizing transparent supportive panel display integral 1200 (e.g. PT-TRIOLCD, from Advanced Link Photonics, Inc., Tustin, Calif.) comprises, with viewer's side as the front side, a liquid crystal cell 210, comprised of a liquid crystal layer 201 sandwiched between a front substrate 202 and an electrode containing rear substrate 203. The front substrate 202 may comprise a thin glass sheet comprising transparent electrodes, such as in a transmissive or transflective type of TFT liquid crystal display. The front substrate 202 may also comprise a thin glass sheet with a stack of transparent retardation compensator plates having a surface coated with transparent electrodes, such as in a reflective, transflective, or transmissive type of TN/STN liquid crystal display. The display integral 1200 (e.g., PT-TRIOLCD) can also include a rear polarizer 204 and a backlight module 208 at the rear side of liquid crystal cell 210. The backlight module 208 may comprise a high efficiency transmissive backlight cell assembly comprising sheets of brightness enhancement films and other polymeric films for enhancing light transmission and optical performances. However, any conventional backlight cell or high brightness backlight cell with edge or backside lamps can be used. Other backlight cells are also possible. The backlight module 208 can also be a transflective or reflective type of light device with a transflector or a reflector. The transflector or the reflector can be the reflective electrodes (not shown) deposited on the front surface of the rear substrate 203, or a sheet member 1201 with transflective or reflective properties positioned on the rear side of the liquid crystal layer 201.

In one embodiment, the sheet member 1201 can simply comprise a reflective polarizer. In other embodiments, the sheet member 1201 is comprised of a diffusing element or structure 1234 and a reflective polarizer 1235. The reflective polarizer 1235 may absorb less than about 10% of incident the light energy. The reflective polarizer 1235 may also have an extinction coefficient, defined as the transmission of the p state polarization over the transmission of the s state polarization, ranging from about 1.5 to 9, for example. In addition, the polarization axis of the reflective polarizer 1235 may be parallel to or within about (+/−) 60 degrees in relation to the polarization axis of the rear polarizer 204 in some embodiments. The rear polarizer 204 and the reflective polarizer 1235 can be formed as an integral by being laminated with a layer of adhesive. It is also possible that in some embodiments the reflective polarizer is used as the rear polarizer 204.

The reflective polarizer 1235 can be formed with multiple sheets of a selective reflective polarizer with optimized polarization axes. The reflective polarizer. 1235 can also be a diffuser laminated selective reflective polarizer. The diffusing element or structure 1234 may be a corrugated surface with haze in the range of about 10% to 85% in some embodiments. The corrugated surface can be a roughened surface on the rear surface of the rear polarizer 204 or on a separate transmissive polymeric substrate, such as PET, PC, PEN, TAC, or ARTON etc. The corrugated surface can also be a dielectric or other material, and may comprise, e.g., $TiO_2$, $Ta_2O_5$, $SiO_2$, SiN, ITO, ZnS, $Al_2O_3$, $LaF_3$, $MgF_2$, Ge, or Si, deposited on the rear surface of the rear polarizer 204, or on a separate sheet of transmissive substrate. The corrugated surface may comprise small metal particles, ranging in size from about 10 nm to 10000 nm, deposited on the rear surface of the rear polarizer 204 or on a separate sheet transmissive substrate. The choice of the metal includes, for example, silver, gold, aluminum, copper, titanium, tantalum, chromium, nickel or an alloy thereof. One or more sheets of loose-packed or optically bonded transmissive substrates with the corrugated surface can make up the diffusing element 1234. In addition, diffusing element 1234 can be optically bonded to the rear surface of the rear polarizer 204 or/and to the front surface of the reflective polarizer 1235. The diffusing element can also be a layer of adhesive material, which bonds the rear polarizer 204 and the reflective polarizer 1235 and comprises dispersed particles such that the haze value of the layer is in the range of about 10% to 85% in some embodiments. In other embodiments such as described herein where a diffuser is utilized, an adhesive material comprising diffusing particles may be used. This adhesive material comprising diffusing particles can diffuse the light. In certain embodiments, the diffusing adhesive has a haze value in the range of about 10% to 85% as described above. Values outside these ranges as well as different configurations both well known as well as those yet devised are possible. Other types of diffusing structures may also be used and may be located elsewhere.

With continued reference to FIG. 12A, the display integral 1200 (e.g. PT-TRIOLCD, from Advanced Link Photonics, Inc., Tustin, Calif.) can also include a first linear polarizer 206, which has a linear polarization axis and selectively passes the module light in one transmission direction. The linear polarizer 206 can be bonded to the front surface of the liquid crystal cell 210 to form an integrated display module. The display integral 1200 (e.g. PT-TRIOLCD) can further include a first retarder layer 205 to the front side of the first linear polarizer 206. The first retarder layer 205 may comprise a quarter wave retarder having a retardance of about $(2m+1)\lambda/4$, where m is an integer and $\lambda$ is between about 400 nm-700 nm. The first retarder layer 205 may comprise a single sheet retarder or a stack of laminated or loose sheets or a film or multiple films. The first retarder layer 205 may comprise quarter wave plates, half wave plates, or full wave plates. The rear surface of the first retarder layer 205 can be laminated to the front surface of the first linear polarizer 206 with an index-matched pressure sensitive adhesive (PSA) to form a first circularly polarizing retarder 260 as a part of display. Quarter wave plates with $R/\lambda$ values in the range between curves 301 and 302, as shown in FIG. 3, can be used. For example, a quarter wave plate having an $R/\lambda$ value between about 0.216 and 0.315 at a wavelength of about 520 nm may be employed. Half wave plates with $R/\lambda$ values in the range between curves 303 and 304 as shown in FIG. 3 can be used. For example, a half wave plate of $R/\lambda$ value between about 0.432 and 0.630 at a wavelength of about 520 nm may be employed. And full wave plates with $R/\lambda$ values in the range between curves 305 and 306 as shown in FIG. 3 can be used. For example, a full wave plate having $R/\lambda$ values between about 0.864 and 1.260 at a wavelength of about 520 nm may be employed.

Figure 4:
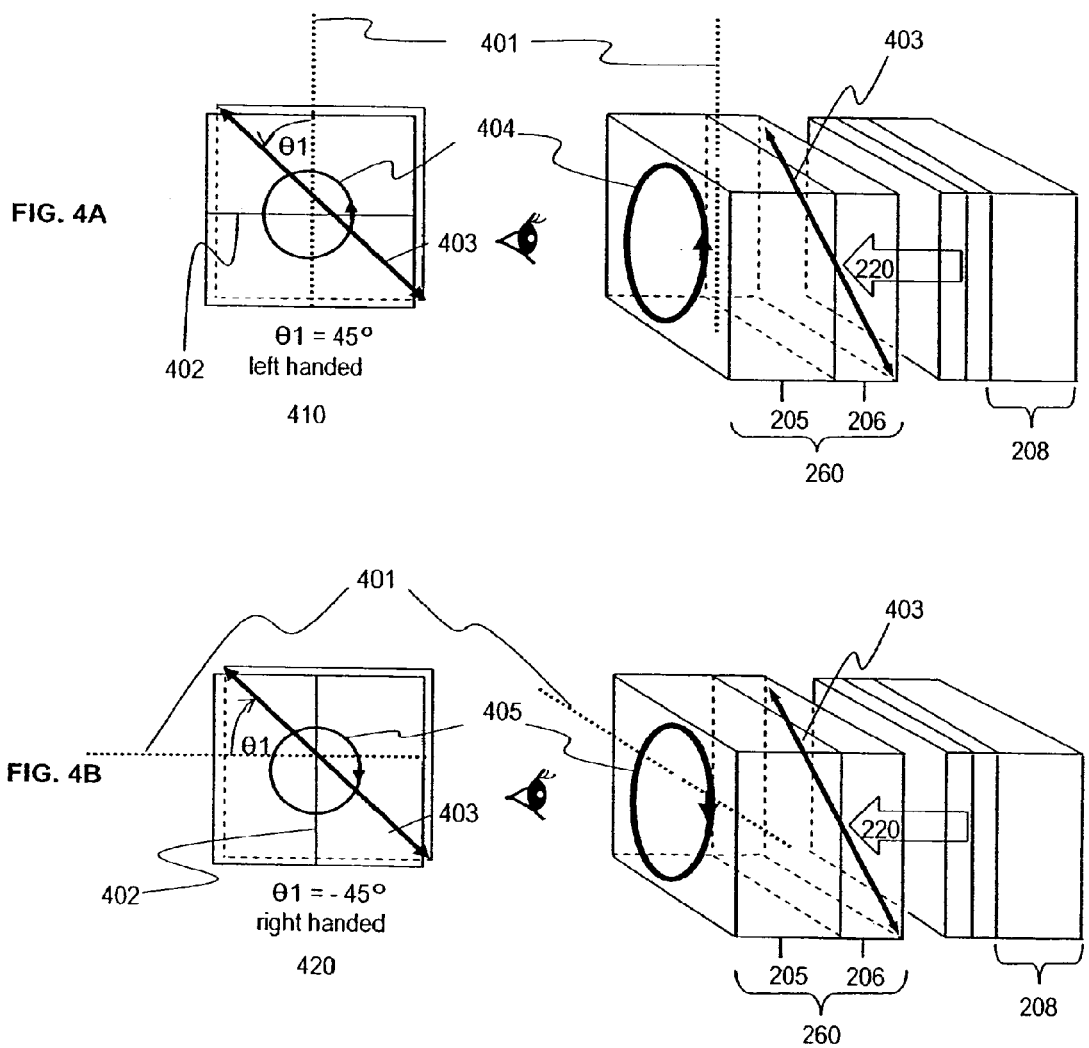
FIGS. 4A and 4B are front and cross-sectional views of LCD display configurations comprising a first retarder layer and a first linear polarizer that produce left-handed and right-handed circularly polarized light, respectively.
Figure 5:
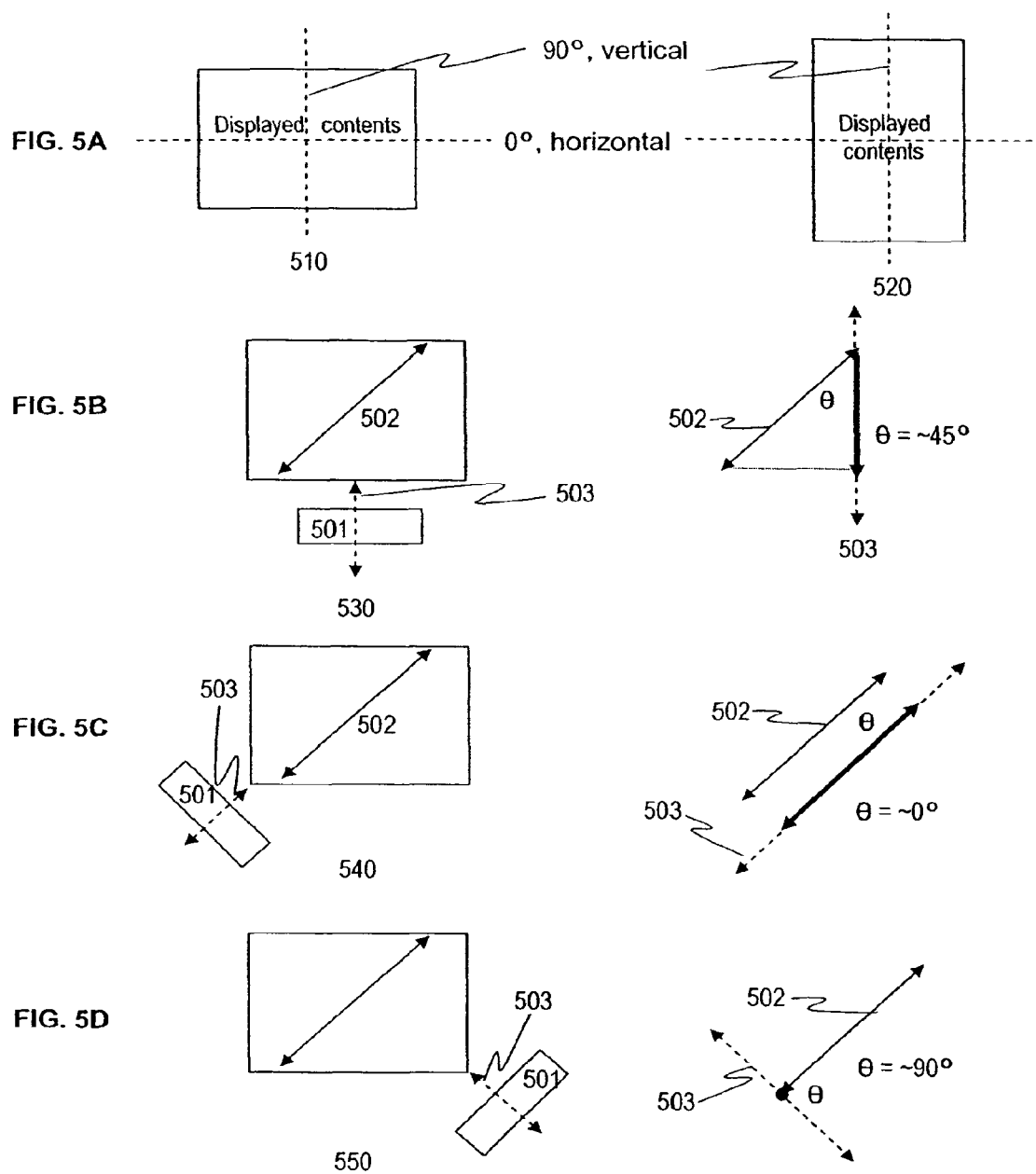
FIGS. 5A-5D are schematic diagrams illustrating the effect of viewing direction on the apparent brightness of a conventional LCD or a conventionally polarized touch screen to a viewer wearing polarized sunglasses.

The slow axis of the first retarder layer 205 may be set at an angle $\eta_1$ in the range of about 25° to 65° or −(25° to 65°, for example at about 45° or −45°, with respect to the polarization axis of the first linear polarizer 206. While viewed from the front side of the retardation plate 205 looking towards the LCD light source, as shown in FIG. 4, if the angle $\theta_1$ is substantially 45°, the configuration of the first circularly polarizing plate 260 is left-handed. If the angle $\theta_1$ is substantially −45°, the configuration of the first circularly polarizing plate 260 is right-handed. Other values outside these ranges may be used.

Figure 12B:
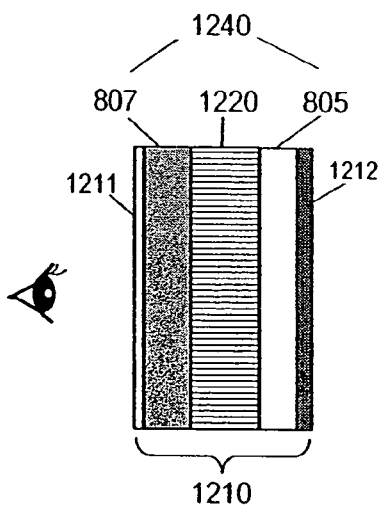
Figure 12C:
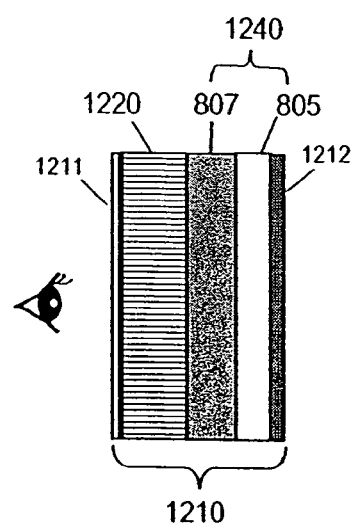

Further referring to FIG. 12A, the display integral 1200 (e.g. PT-TRIOLCD, from Advanced Link Photonics, Inc., Tustin, Calif.) also includes a transparent protection panel 1210 that circularly polarizes the incident sunlight 140. The protection panel 1210 has a front surface 1211 and a rear surface 1212. Practically, the transparent protection panel 1210 can be the integral of the linear polarizer 807 and the retarder layer 805. It is also possible that a separate transparent supportive substrate 1220 is added to form the transparent protection panel 1210. The transparent supportive substrate 1220 can be a sheet of glass or plastic. In some embodiments, the supportive substrate 1220 can also be a type of touch input device, such as a resistive touch panel, a capacitive touch panel, a SAW touch panel, a near field image touch panel, or an IR touch panel. The separate transparent supportive substrate 1220 can be at the rear side of the retarder layer 805 as shown in FIG. 12A. The supportive substrate 1220 can also be between the linear polarizer 807 and the retarder layer 805 as shown in FIG. 12B. The supportive substrate can further be at the front side of the linear polarizer 807 as shown in FIG. 12C. These sheet members of the protection panel 1210, regardless the positioning of the supportive substrate 1220, can be laminated to from an integral panel. An isotropic transparent substrate can be used to construct the supportive transparent substrate 1220. It is also possible to use non-isotropic material and the retardance of the supportive transparent substrate 1220 may be taken into consideration. Or in some embodiments, the non-isotropic substrate 1220 can be positioned forward the linear polarizer 807 as shown in FIG. 12C to avoid interferences may be generated by non-isotropic substrate. This polarizing protection panel 1210 can effectively prevent the back reflections that would be generated by rearward reflective surfaces of parts such as an EMI shielding, an IR blocking and a screen heater. Details will be further discussed in the following sections. Thus, other functional parts comprising conductive films, such as an EMI shield, an IR block and a screen heater can be integrated by introducing the parts on separate substrates to the rear side of the protection panel (not shown). Or these functional parts can be easily incorporated into the display integral 1200 using the front surface 207 of the first retarder layer 205 and the rear surface 1212 of the transparent protection panel 1210 as the surfaces for conductive film coating to form the above mentioned functional parts. Practically, EMI shielding and IR blocking (EMI/IR) can be integrated in a single sheet of transparent substrate coated with conductive film. To provide EMI shielding, the conductive film may be grounded. Screen heating and IR blocking functions (IR/heater) can also be achieved on a single sheet of transparent substrate coated with conductive film. The conductive film may also be electroded to provide current flow for resistive heating. In one embodiment, the IR blocker can also be a hot mirror coating comprising dielectric material and may comprise all dielectric material. Thus, to incorporate either EMI/IR or/and IR/heater, a conductive film can be deposited on either (or both) surfaces 207 and 1212. The conductive film may comprise, for example, ITO, ZnO, Ni, Cr, Au, $ZrO_2$, $TiO_2$, $SiO_2$, or $SnO_2$ having a conductivity in the range, e.g., of about 1 ohm to 1000 ohm per square, a transmission of about 50% to 95% in the visible range of about 400 nm to 700 nm, and a reflectance of about 20% to 90% for wavelengths about 700 nm and greater. Values outside these ranges are possible. The EMI/IR or IR/heater may be provided with proper electrodes or grounding setups as discussed above. Various combinations are possible or alternatively only one functional part may be included. Integration of functional parts by introducing a separate conductive film coated substrate is also possible as mentioned above.

Still referring to FIG. 12A, the second retarder layer 805 may comprise a quarter wave retarder having a retardance of about $(2n+1)\lambda/4$, where n is an integer and $\lambda$ is between about 400 nm-700 nm. The second retarder layer may comprise a single sheet retarder or a stack of laminated or loose sheets or a film or multiple films. The second retarder layer may comprise quarter wave plates, half wave plates, or full wave plates. Quarter wave plates with $R/\lambda$ values in the range between curves 301 and 302, as shown in FIG. 3, can be used. For example, a quarter wave plate having an $R/\lambda$ value between about 0.216 and 0.315 at a wavelength of about 520 nm may be employed. Half wave plates with $R/\lambda$ values in the range between curves 303 and 304 as shown in FIG. 3 can be used. For example, a half wave plate having an $R/\lambda$ value between about 0.432 and 0.630 at a wavelength of about 520 nm may be employed. And full wave plates with $R/\lambda$ values in the range between curves 305 and 306 as shown in FIG. 3 can be used. For example, a full wave plate having an $R/\lambda$ value between about 0.864 and 1.260 at a wavelength of about 520 nm can be employed.

The polarization axis of the second linear polarizer 807 may be set at an angle $\theta_2$ in the range of about $\pm(25°-65°)$, for example at about $\pm45°$, to the slow axis of the second retarder layer 805 forming the second circular polarizer 1240. This second circular retarder effectively reduces or prevents the reflections from the reflective surfaces, such as 1212 and 207 or other highly reflective functional parts (not shown). However, as previously disclosed, the polarization axis of the second linear polarizer 807 can be conveniently set at an angle in the range of 0 to 360° regardless the orientation of the polarization axis of the first linear polarizer 205.

The following examples illustrate that in such an arrangement, the reflections generated by the air-surface interfaces or the conductive film coated surfaces 1212 and 207 are effectively reduced by the second circularly polarizing plate 1240 comprised by the linear polarizing plate 807 and the retarder layer 805 in FIGS. 12A, 12B, and 12C. Nevertheless, the LCD transmissive and transflective illuminations are effectively transmitted as discussed above.

Figure 13:
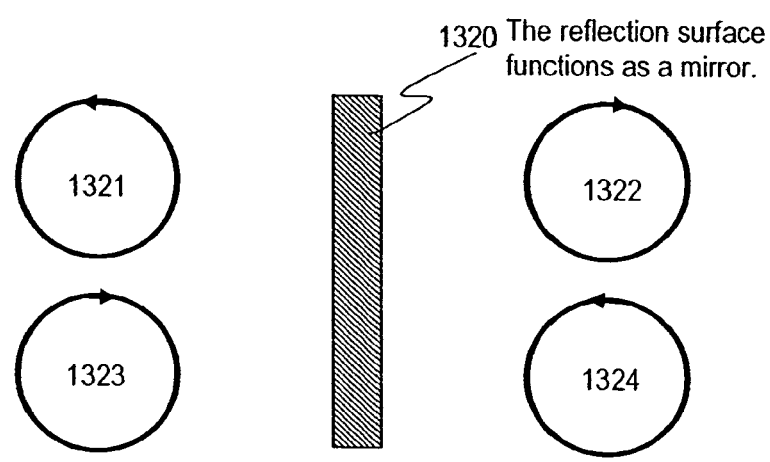
FIG. 13 is a schematic diagram illustrating the polarization change of a circular polarized light upon reflection.

FIG. 13 is a schematic diagram illustrating the polarization change of circular polarized light upon reflection. Circularly polarized light is reflected with reversed polarization. Left-handed circularly polarized light 1321 is reflected by a reflective surface 1320, which operates as a mirror, and converted into the right-handed circularly polarized light 1322. Right-handed circularly polarized light 1323 is reflected by the reflective surface 1320 and converted into left-handed circularly polarized light 1324 upon reflection.

FIG. 14A is an enlarged projection view around the second linear polarizer 807 of FIGS. 12A, 12B, and 12C. In some embodiments, the supportive substrate is made of isotropic material with reduced or minimum retardation properties. The configuration of the polarizing transparent protection panel can be determined by considering the polarization of the linear polarizer 807 and the retardation of the retarder 805. As shown, the second linear polarizer 807 has a polarization axis 1001 and the second retarder layer 805 has a slow axis 1002. A front view is depicted in FIG. 14B. As seen from the perspective of the viewer, $\theta_2$ is about 45°. The incident sunlight 140 is linearly polarized by the second linear polarizer 807 and has a polarization parallel to the polarization axis 1001. The orientation of this linear polarization is about 45° with respect to the slow axis 1002 of the second retarder layer 805. The linear polarized light therefore emerges from the second retarder layer 805 as left-handed circularly polarized light 140*cir*. The circularly polarized light 140*cir* is reflected from the reflective conductive film coated surfaces (such as 1212 and 207 in FIG. 12A), which is collectively indicated as surface 1420. As shown in FIG. 14C, the right-handed polarized beams that are reflected are indicated as 1430*cir*. This right-handed polarized light 1430*cir* travels back to the second retarder layer 805 where the right-handed circularly polarized light is converted into a linearly polarized light with a polarization axis indicated by an arrow 1403. As shown, the polarization axis 1403 is perpendicular to the polarization axis 1001 of the second linear polarizer 807, and is thus not transmitted through the second linear polarizer 807. Thus, the reflected light beams 1403*cir* can be effectively blocked from viewer's eyes regardless of the number of conductive films in the system.

Figure 9:
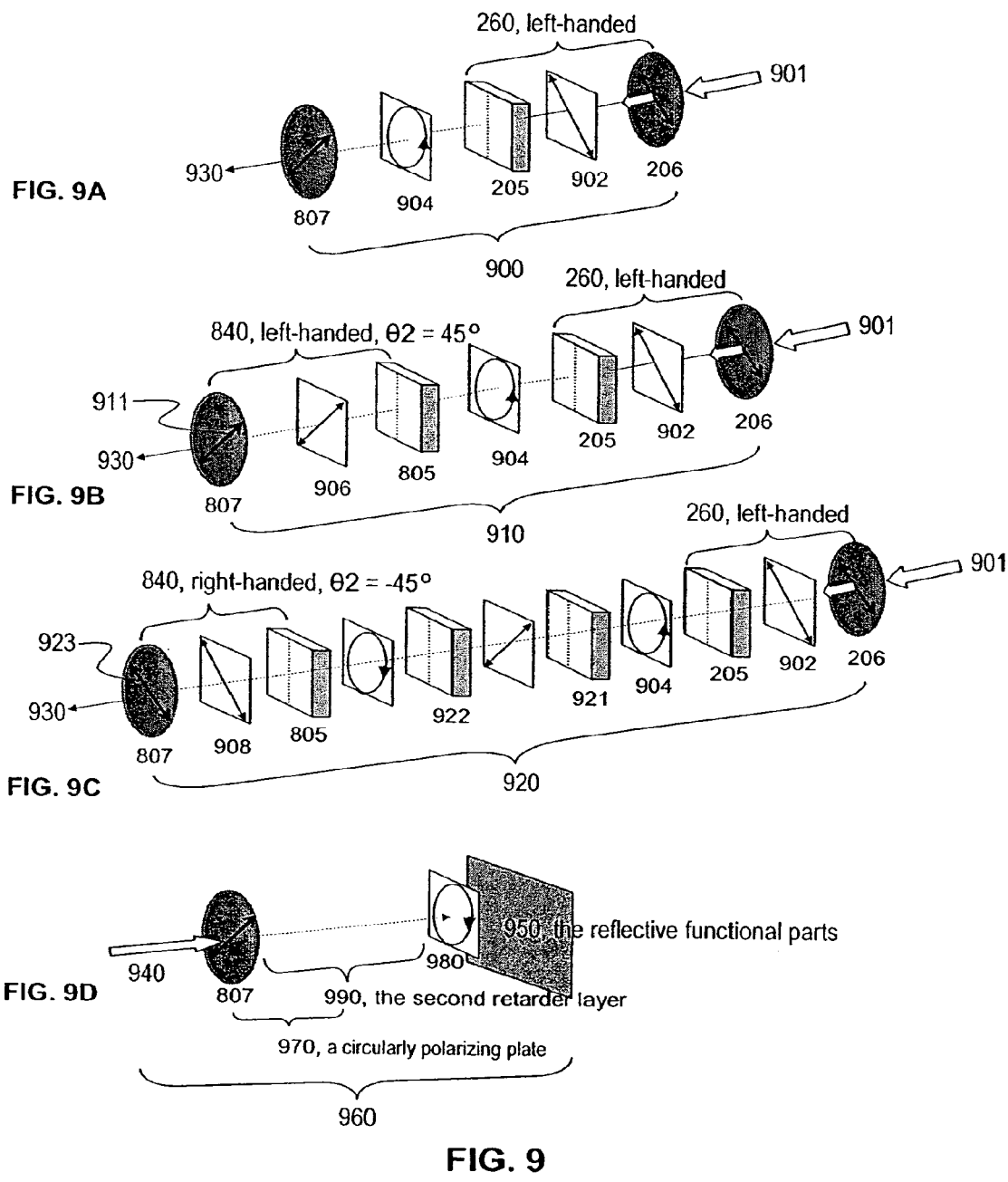
FIGS. 9A-9C are schematic diagrams of light propagating between two linear polarizers with various retarder layers disposed therebetween.
FIG. 9D is a schematic diagram that shows how reflection of incident light from surfaces in the display is reduced or minimized by using circularly polarized light.
Figure 10:
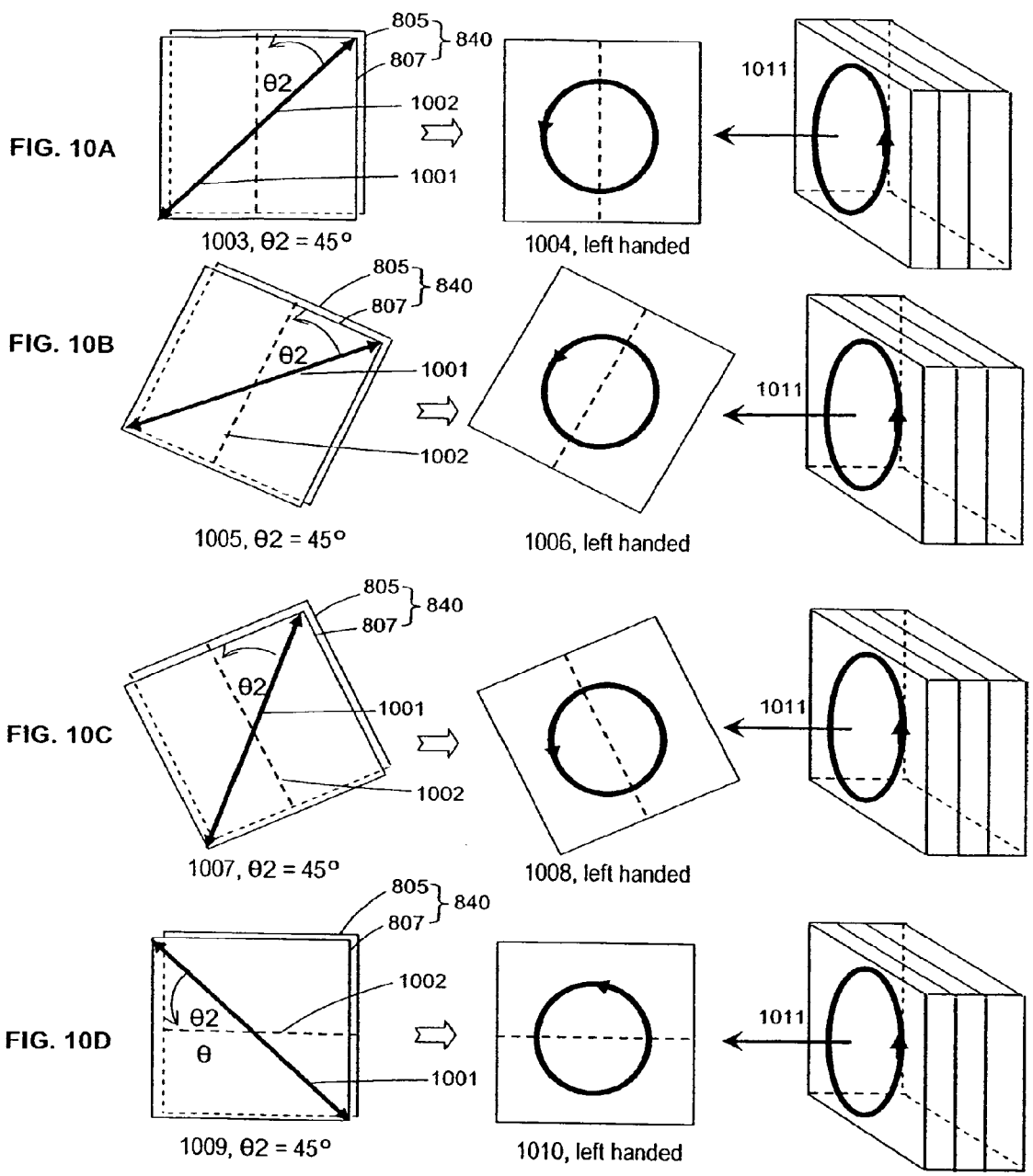
FIGS. 10A-10D are schematic diagrams of circularly polarized light generated by various orientations of the second circularly polarizing retarder.

As briefly discussed with reference to FIG. 9, the relative configurations of the second and first circular retarders 840 and 260 may be determined by retardance of the two retarder layers, $(2m+1)\lambda/4$ for 205 and $(2n+1)\lambda/4$ for 807, where n and m are integers and $\lambda$ is about 400 nm-700 nm. When (n+m) is 0 or an even integer, the configuration of the first and second circular retarders 260 and 840 are the same (e.g. both left-handed or both right-handed). If (n+m) is an odd integer, the configurations of the second and first circularly polarizers 840 and 260 are to be reverse to each other. Other values outside these ranges may also be used.

With reference back to FIGS. 12A, 12B, and 12C, to determine the corresponding configurations of the first and second circular retarders 260 and 1240 in the display integral 1200 (e.g. PT-TRIOLCD), the retardance of the supportive substrate 1220 and functional part(s) may be taken into consideration. In certain embodiments, the supportive substrate and the functional parts are made of thin glass sheets or isotropic plastic sheets, such as PET, PEN, TAC, PC, ARTON, etc., with minimum retardation properties, for example with retardance less than about 80 nm. In such embodiments with (n+m) being 0 or an even integer, the propagation of LCD illumination 1221 is substantially equivalent to the propagation of the light 901 in the arrangement 910 of FIG. 9. Accordingly, the configurations of the first and second circular polarizers 260 and 1240 can be determined to be the same as each other (e.g., both right-handed or both left-handed). That is to say, if the first circular retarder 260 is right-handed with $\theta_1$ being substantially −45° as shown in 420 of FIG. 4B, the polarization axis of the second linear polarizer 807 is set such that the angle from the polarization axis of the second linear polarizer to the slow axis of the second retarder layer 805 is substantially at −45°, which makes the second circular retarder 1240 right-handed. And if the first circular retarder 260 is left-handed with $\theta_1$ being substantially 45° as shown in 410 of FIG. 4A, the polarization axis of the second linear polarizer 807 is set such that the angle from the polarization axis of the second linear polarizer to the slow axis of the second retarder layer 805 is substantially at 45° to the slow axis of the second retarder layer 805, which makes the second circular retarder left-handed.

On the other hand, if (n+m) is an odd integer and the retardance of the functional parts is not significant, the configurations of the first and second circular polarizers 260 and 1240 can be determined to be opposite as each other (e.g., one right-handed and one left-handed, like in FIG. 9C). That is to say, if the first circular retarder 260 is left-handed with $\theta_1$ being substantially 45° as shown in 410 of FIG. 4A, the polarization axis of the second linear polarizer 807 is set such that the angle from the polarization axis of the second linear polarizer to the slow axis of the second retarder layer 805 is substantially at −45°, which makes the second circular retarder 1240 right-handed. And if the first circular retarder 260 is right-handed with $\theta_1$ being substantially −45° as shown in 420 of FIG. 4B, the polarization axis of the second linear polarizer 807 is set such that the angle from the polarization axis of the second linear polarizer to the slow axis of the second retarder layer 805 is substantially at 45° to the slow axis of the second retarder layer 805, which makes the second circular retarder left-handed.

In some other embodiments, the functional parts may contain significant retardance. The retardance of the functional parts may be integrated as a part of the first retarder layer retardance, which may be adjusted to obtain an effective retardance of about $(2m+1)\lambda/4$. The configurations of the first and second circular retarders 260 and 1240 may be determined accordingly. Thus, efficient delivery of both reflective illumination 1250 and transmissive illumination 1221 to viewer's eyes can be achieved.

In various preferred embodiments, an air gap between components creates two air-material interfaces, which cause reflections due to index mismatch. These reflections may interfere and compromise the optical performances of the integral. The air-material interfaces can be eliminated by laminating the separate parts together and removing the air gap therebetween. However, adequately applying anti-reflection treatment or incorporating diffusing property on surfaces can also conveniently reduce undesirable backreflections and the resultant interference and enhance the optical properties of the integral. For example, the rear surface of the first retarder layer 205 can be laminated to the front surface of the first linear polarizer 206 to form an integrated display module as described in FIG. 2. In such an arrangement, a diffusing element or structure or an anti-reflection treatment (not shown) can be included on the front surface of the first retarder layer 205, the front or rear surface of the reflective parts (not shown), or the rear surface 1212 of the protection panel 1210 to curtail or prevent interference of the reflections and enhance the optical properties. The diffusing structure (not shown) can be a roughened surface or may comprise particles (as discussed above) deposited on the front surface of the first retarder layer 205. In certain embodiments, the diffusing structure may comprise a laminated sheet member (not shown) with diffusing property of Haze value greater than zero. In other arrangements, the front surface of the first retarder layer 205 is laminated to the rear surface of the reflective parts (not shown) or the front surface 1212 of the protection panel 1210. In such arrangements, an anti-reflection treatment (not shown) or diffusing structure may be disposed on at least one of the rear surface of the first retarder layer 205 and on the front surface of the first linear polarizer 206 to achieve the equivalent optical performances. Different types of diffusing structures may be used and other configurations are possible (for example, the diffusing structure and/or anti-reflective coating may be located elsewhere).

In some arrangements, depending on the properties of the first and second retarder layers 205 and 805 used, color distortion may sometime be observed. Color correction can be achieved by offsetting either angle $\theta_1$ between the first retarder layer 205 and the first linear polarizer 206, or angle $\theta_2$ between the second linear polarizer 807 and the second retarder layer 805. For example, angle $\theta_1$ may be offset. The amount of angle adjustment can be within about ±20° off the ±45°. In other embodiments, 2n equivalent quarter wave plates, n being an integer, can be introduced between the first retarder layer 205 and the protection panel 1210 as color correcting sheets (not shown). With proper arrangement of the optical axes among the plates, satisfactory color corrections can be obtained. In one embodiment, depending on the equivalent retardance of the plates introduced for the color correction, configurations of the first and second circularly polarizers 260 and 1240 may need to be adjusted according to the discussion presented above in connection with FIG. 9.

With continued reference to FIGS. 12A, 12B, and 12C, as discussed above, the polarization axis of the second linear polarizer 807 can be conveniently set at any orientation in the range of 0 to 360 degrees, e.g., at 90 degrees to the horizontal, regardless the orientation of the polarization axis of the first linear polarizer 206. At least two advantages result. First, setting the polarization axis at 90 degrees provides a cost saving in production. A linear polarizer is a relatively expensive raw material. A regular polarized touch screen is usually made with 45° or 135° light in order to match up with the light transmission direction of a regular LCD, in which case the sheet of linear polarizer will need to be cut diagonally. In one embodiment, there is no need to restrict the orientation of the polarization axis of the second linear polarizer 807, and the polarizer sheet can be cut in any way, whichever is cost beneficial. Second, a 90° transmission direction can provide convenient viewing zones for viewers wearing sunglasses as discussed in connection with FIG. 11.

Still referring to FIG. 12A, the advantage of being able to deliver convenient viewing zones for viewers wearing polarized sunglasses can also be achieved by further disposing a third retarder layer 1203 to the front side of the protection panel 1210 as described above. The third retarder layer 1203 may comprise a quarter wave retarder having a retardance of about $(2k+1)\lambda/4$, where k an integer and $\lambda$ is about 400 nm-700 nm. The third retarder layer 1203 may comprise a single sheet retarder or a stack of laminated or loose sheets or a film or multiple films. The third retarder layer 1203 may comprise quarter wave plates, half wave plates, or full wave plates. The third retarder layer 1203 converts the otherwise linearly polarized transmission 1221 to a circularly polarized transmission. The advantage of the effect can be similarly understood with reference to discussions of FIGS. 6 and 7. The front surface 1211 of the protection panel 1210 or the front surface 1204 of the third retarder layer 1203 may comprise a highly efficient multi-layer anti-reflection coating, for example, having reflection less than about 1.5% to reduce or prevent the surface reflection 1230 and to increase or maximize the entry of light beam 140 for reflective illumination 1250. In some embodiments, the front surface 1211 of the transparent protection panel 1210 or the front surface 1204 of the third retarder layer 1203 can also comprise a separate transmissive substrate, e.g., glass or plastic, such as PET, PEN, TAC, PC, ARTON, with its front surface being coated with the high efficient multi-layer anti-reflection coating, for example, providing reflection less than about 1.5%. The rear surface of the separate transmissive substrate can be bonded to the front surface 1211 of the protection panel or the front surface of the third retarder layer 1203 with index matching pressure sensitive adhesive (PSA). Combination of reduction or minimization of reflections, 1230 and 1231, and increase or maximization of LCD illuminations, 1221 and 1250, in this embodiment, is sufficient to make the display integral 1200 (e.g. PT-TRIOLCD) direct sunlight readable. Values outside the ranges provided above and other configurations may be employed (for example, the anti-reflective coating may be located elsewhere).

Figure 15A:
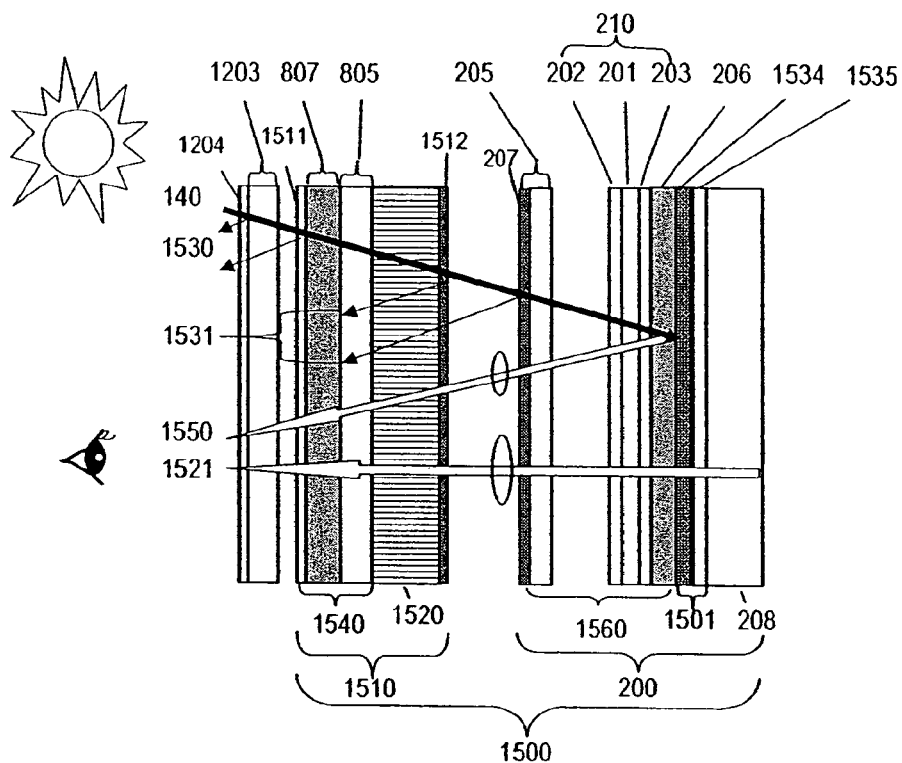
FIGS. 15A-15C are schematic diagrams showing a polarizing transparent protection panel integrated together with an alternative liquid crystal display with or without incorporation of other functional parts.

FIG. 15A shows a polarizing transparent protection panel integrated together with an alternative liquid crystal display with or without incorporation of functional parts. The polarizing transparent protection panel display integral 1500 (e.g. PT-TRIOLCD, Advanced Link Photonics, Inc., Tustin, Calif.) comprises, with viewer's side as the front side, a liquid crystal cell 210, comprised of a liquid crystal layer 201 sandwiched between a front substrate 202 and an electrode containing rear substrate 203. The front substrate 202 may comprise a thin glass sheet comprising transparent electrodes, such as in a transmissive or transflective type of TFT liquid crystal display. The front substrate 202 may also comprise a thin glass sheet with a stack of transparent retardation compensator plates having a surface coated with transparent electrodes, such as in a reflective, transflective, or transmissive type of TN/STN liquid crystal display. The display integral 1500 (e.g., PT-TRIOLCD) can also include a backlight module 208 at the rear side of liquid crystal cell 210. The backlight module 208 may comprise a high efficiency transmissive backlight cell assembly comprising sheets of brightness enhancement films and other polymeric films for enhancing light transmission and optical performances. However, any conventional backlight cell or high brightness backlight cell which may have edge or backside lamps can be used. Other backlight cells are also possible. The backlight module 208 can also be a transflective or reflective type of light device with a transflector or a reflector. The transflector or the reflector can be the reflective electrodes (not shown) deposited on the front surface of the rear substrate 203, or a sheet member 1501 with transflective or reflective properties positioned on the rear side of the liquid crystal layer 201. The display integral 1500 (e.g. PT-TRIOLCD) can also include a first linear polarizer 206 which has a linear polarization axis and selectively polarizes the emitted light from the backlight module 208 to one direction. The linear polarizer 206 can be bonded to the rear surface of the liquid crystal cell 210.

In one embodiment, the sheet member 1501 can simply comprise a reflective polarizer, which can be laminated to the rear surface of the linear polarizer 206 to form an integral. In other embodiments, the sheet member 1501 is comprised of a diffusing element or structure 1534 and a reflective polarizer 1535. The reflective polarizer 1535 may absorb less than about 10% of the incident light energy in some embodiments. The reflective polarizer 1535 may also have an extinction coefficient, defined as the transmission of the p state polarization over the transmission of the s state polarization, ranging from about 1.5 to 9, for example. In addition, the polarization axis of the reflective polarizer 1535 may be parallel to or within about (+/−) 60 degrees in relation to the polarization axis of the first linear polarizer 206 in some embodiments. The first linear polarizer 206 and the reflective polarizer 1535 can be formed as an integral by being laminated with a layer of adhesive. It is also possible that in some embodiments, the reflective polarizer 1535 is used as the first linear polarizer 206.

The reflective polarizer 1535 can be formed with multiple sheets of a selective reflective polarizer with optimized polarization axes. The reflective polarizer 1535 can also be a reflective polarizer that comprises a diffuser laminated thereto. The diffusing element or structure 1534 may be a corrugated surface with haze in the range of about 10% to 85% in some embodiments. The corrugated surface can be a roughened surface on the rear surface of the first linear polarizer 206 or on a separate transmissive polymeric substrate, such as PET, PC, PEN, TAC, or ARTON etc. The corrugated surface can also be a dielectric or other material, and may comprise, e.g., $TiO_2$, $Ta_2O_5$, $SiO_2$, SiN, ITO, ZnS, $Al_2O_3$, $LaF_3$, $MgF_2$, Ge, or Si, deposited on the rear surface of the first linear polarizer 206, or on a separate sheet of transmissive substrate. The corrugated surface may comprise small metal particles, ranging in size from about 10 nm to 10000 nm, deposited on the rear surface of the first linear polarizer 206 or on a separate sheet transmissive substrate. The choice of the metal includes, for example, silver, gold, aluminum, copper, titanium, tantalum, chromium, nickel or an alloy thereof. One or more sheets of loose-packed or optically bonded transmissive substrates at least one of which has a corrugated surface can make up the diffusing element 1534. In addition, diffusing element 1534 can be optically bonded to the rear surface of the first linear polarizer 206 or/and to the front surface of the reflective polarizer 1535. The diffusing element can also be a layer of adhesive material, which bonds the first linear polarizer 206 and the reflective polarizer 1535 and comprises dispersed particles such that the haze value of the layer is in the range of about 10% to 85% in some embodiments. In other embodiments such as described herein where a diffuser is utilized, an adhesive material comprising diffusing particles may be used. This adhesive material comprising diffusing particles can diffuse the light. In certain embodiments, the diffusing adhesive has a haze value in the range of about 10% to 85% as described above. Values outside these ranges as well as different configurations both well known as well as those yet devised are possible. Other types of diffusing structures may also be used and may be located elsewhere.

With continued reference to FIG. 15A, the display integral 1500 (e.g., PT-TRIOLCD) can further include a first retarder layer 205 to the front side of the liquid crystal cell 210. The first retarder layer 205 may comprise a quarter wave retarder having a retardance of about $(2m+1)\lambda/4$, where m is an integer and $\lambda$ is between about 400 nm-700 nm. The first retarder layer 205 may comprise a single sheet retarder or a stack of laminated or loose sheets or a film or multiple films. The first retarder layer 205 may comprise quarter wave plates, half wave plates, or full wave plates. The rear surface of the first retarder layer 205 can be laminated to the front surface of the liquid crystal cell 210 with an index-matched pressure sensitive adhesive (PSA). Quarter wave plates with R/λ values in the range between curves 301 and 302, as shown in FIG. 3, can be used. For example, a quarter wave plate having an R/λ value between about 0.216 and 0.315 at a wavelength of about 520 nm may be employed. Half wave plates with R/λ values in the range between curves 303 and 304 as shown in FIG. 3 can be used. For example, a half wave plate of R/λ value between about 0.432 and 0.630 at a wavelength of about 520 nm may be employed. And full wave plates with R/λ values in the range between curves 305 and 306 as shown in FIG. 3 can be used. For example, a full wave plate having R/λ values between about 0.864 and 1.260 at a wavelength of about 520 nm may be employed.

The light polarization and configuration of the first circularly polarizing plate 1560 in arrangement of 1500 can be understood by the light polarization and configuration of the first circularly polarizing plate 1560 illustrated in FIGS. 16A, 16B, 16C and 16D. As indicated in the arrangements 1580 and 1590 of FIGS. 16C and 16D, respectively, the slow axis 1553 of the first retarder layer 205 may be set at an angle $\theta_0$ in the range of about −(25° to 65°) or 25° to 65°, for example at about −45° or 45°, with respect to the polarization axis 1551 of the first linear polarizer 206 (as measured from the slow axis 1553 to the polarization axis 1551). It is common that a liquid crystal cell introduces a change of polarization state of the passing linearly polarized light due to the optical properties of twisted numerical liquid crystal layer sandwiched within. A most common polarization change introduced by the liquid crystal layer is 90 degree, which will be used as an example for the determination of configurations of the first circularly polarizing plate in this embodiment. Thus, as shown in the arrangement 1570 of FIG. 16B (see also FIG. 16A), the emitted light 1521 in display integral 1500 from the backlight module 208, passing through the first linear polarizer 206 with the direction of polarization of 1551, is altered by 90 degree to the polarization direction indicated by 1552 before entering the first retarder layer 205. Thus, the first linear polarizer 206, the liquid crystal cell 210, and the first retarder layer 205 constitute the first circularly polarizing plate 1560 with an effective configuration that is determined by the display module light transmission direction 1552 and the slow axis 1553. While viewed from the front side of the retardation plate 205 looking towards the LCD light source, as shown in arrangement 1580 of FIG. 16C, with angle $\theta_0$ being substantially −45°, the angle $\theta_1$ of the slow axis 1553 to the display module light transmission polarization 1552 is substantially 45°. The configuration of the first circularly polarizing plate 1560 is thus effectively determined by the slow axis 1553 to the polarization direction 1552 to be a left-handed as previously defined (reference also FIG. 4A). Similarly as shown in arrangement 1590 of FIG. 16D, with angle $\theta_0$ being substantially 45°, the configuration of the first polarizing plate 1560 is determined by the angle $\theta_1$, −45°, of the slow axis 1553 to the display module light transmission polarization 1552 to be right-handed (also reference FIG. 4B). Other values outside these ranges may be used.

Figure 15B:
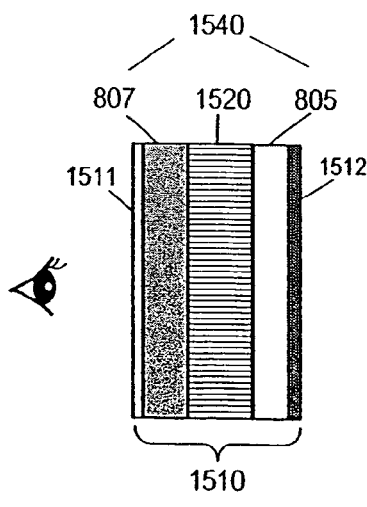
Figure 15C:
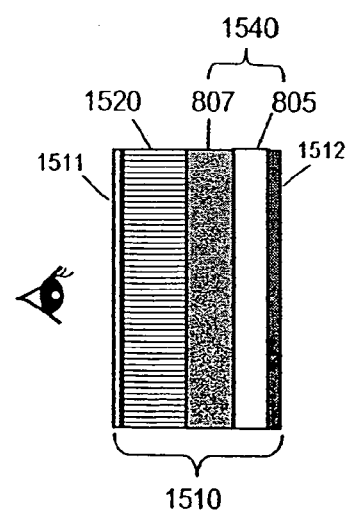

Referring back to FIG. 15A, the display integral 1500 (e.g. PT-TRIOLCD) also includes a transparent protection panel 1510 that circularly polarizes incident sunlight 140. The protection panel has a front surface 1511 and a rear surface 1512. Practically, the transparent protection panel 1510 can be the integral of the linear polarizer 807 and the retarder layer 805. It is also possible that a separate transparent supportive substrate 1520 is added to form the transparent protection panel 1510. The transparent supportive substrate 1520 can be a sheet of glass or plastics. In some embodiments, the supportive substrate 1520 can also be a type of touch input device, such as a resistive touch panel, a capacitive touch panel, a SAW touch panel, a near field image touch panel, or an IR touch panel. The separate transparent supportive substrate 1520 can be at the rear side of the retarder layer 805 as shown in FIG. 15A. The supportive substrate 1520 can also be between the linear polarizer 807 and the retarder layer 805 as shown in FIG. 15B. The supportive substrate can further be at the front side of the linear polarizer 807 as shown in FIG. 15C. These sheet members of the protection panel 1510, regardless the positioning of the supportive substrate 1520, can be laminated to from an integrated panel. An isotropic transparent substrate can be used to construct the supportive transparent substrate 1520. It is also possible to use non-isotropic material and the retardance of the supportive transparent substrate 1520 may be taken into consideration. Or in some embodiments, the non-isotropic substrate 1520 can be positioned forward the linear polarizer 807 as shown in FIG. 15C to avoid interferences that may be generated by non-isotropic substrate. This circularly polarizing protection panel 1510 can effectively prevent the back reflections that would be generated by reflective surfaces or parts, such as an EMI shield, an IR block and a screen heater as discussed above. Thus, other functional parts comprising conductive films, such as an EMI shield, an IR block and a screen heater, can be integrated by introducing the parts on separate substrates to the rear side of the protection panel (not shown). Or these functional parts can be easily incorporated into the display integral 1500 using the front surface 207 of the first retarder layer 205 and the rear surface 1512 of the transparent protection panel 1510 as the surfaces for conductive film coating to from the above mentioned functional parts. Practically, EMI shielding and IR blocking (EMI/IR) can be integrated in a single sheet of transparent substrate coated with conductive film. To provide EMI shielding, the conductive film may be grounded. Screen heating and IR blocking functions (IR/heater) can also be achieved on a single sheet of transparent substrate coated with conductive film. The conductive film may also be electroded to provide current flow for resistive heating. In one embodiment, the IR blocker can also be a hot mirror coating comprising dielectric material and may comprise all dielectric material. Thus, to incorporate either EMI/IR or/and IR/heater, a conductive film can be deposited on either (or both) surfaces 207 and 1512. The conductive film may be deposited on the surface and may comprise, for example, ITO, ZnO, Ni, Cr, Au, $ZrO_2$, $TiO_2$, $SiO_2$, or $SnO_2$ having a conductivity in the range, e.g., of about 1 ohm to 1000 ohm per square, a transmission of about 50% to 95% in the visible range of about 400 nm to 700 nm, and a reflectance of about 20% to 90% for wavelengths about 700 nm and greater. Values outside these ranges are possible. The EMI/IR or IR/heater may be provided with proper electrodes or grounding setups as discussed above. Various combinations are possible or alternatively only one functional part may be included. Integration of functional parts by introducing a separate conductive film coated substrate is also possible as mentioned above.

Still referring to FIG. 15A, the second retarder layer 805 may comprise a quarter wave retarder having a retardance of about $(2n+1)\lambda/4$, where n is an integer and λ is between about 400 nm-700 nm. The second retarder layer may comprise a single sheet retarder or a stack of laminated or loose sheets or a film or multiple films. The second retarder layer may comprise quarter wave plates, half wave plates, or full wave plates. Quarter wave plates with R/λ values in the range between curves 301 and 302, as shown in FIG. 3, can be used. For example, a quarter wave plate having an R/λ value between about 0.216 and 0.315 at a wavelength of about 520 nm may be employed. Half wave plates with R/λ values in the range between curves 303 and 304 as shown in FIG. 3 can be used. For example, a half wave plate having an R/λ value between about 0.432 and 0.630 at a wavelength of about 520 nm may be employed. And full wave plates with R/λ values in the range between curves 305 and 306 as shown in FIG. 3 can be used. For example, a full wave plate having an R/λ value between about 0.864 and 1.260 at a wavelength of about 520 nm can be employed.

The polarization axis of the second linear polarizer 807 may be set at an angle $\theta_2$ in the range of about ±(25°-65°), for example at about ±45°, to the slow axis of the second retarder layer 805 forming the second circular polarizer 1540. This second circular retarder effectively reduces or prevents the reflections from the reflective surfaces 1512, the front surface 207 of 205, or other highly reflective functional parts (not shown). However, as previously disclosed, the polarization axis of the second linear polarizer 807 can be conveniently set at an angle in the range of 0 to 360° regardless the orientation of the polarization axis of the first linear polarizer 205.

As discussed with reference to FIG. 9, the design or configurations of the second and first circular retarders 840 and 860 may be determined by retardance of the two retarder layers, $(2m+1)\lambda/4$ for 205 and $(2n+1)\lambda/4$ for 807, where n and m are integers and $\lambda$ is about 400 nm-700 nm. When (n+m) is 0 or an even integer, the configuration of the first and second circular retarders 860 and 840 are the same (e.g. both left-handed or both right-handed); see FIG. 9B. If (n+m) is an odd integer, the configurations of the second and first circularly polarizers 840 and 860 are to be reverse to each other; see FIG. 9C. Other values outside these ranges may also be used.

As described above, however, the liquid crystal cell 210 may introduce a 90 degree rotation of a linearly polarized light in some embodiments. The design of the structure 1500 may be adjusted to accommodate this 90° polarization change. In particular, the orientation of the polarizers and/or retarders may be altered in the first or second circular retarders, or both, in certain preferred embodiments.

With reference back to FIG. 15A, to determine the corresponding configurations of the first and second circular polarizers 1560 and 1540 in the display integral 1500 (e.g. PT-TRIOLCD), the retardance of the supportive substrate and functional part(s) may also be taken into consideration. In certain embodiments, the supportive substrate and functional pars are made of thin glass sheets or isotropic plastic sheets, such as PET, PEN, TAC, PC, ARTON, etc., with minimum retardation properties, for example with retardance less than about 80 nm. In such embodiments, with (n+m) being 0 or an even integer, the propagation of LCD illumination 1521 is substantially equivalent to the propagation of the light 901 in the arrangement 910 of FIG. 9B. Accordingly, the configurations of the first and second circular retarders 1560 and 1540 can be determined to be the same as each other (e.g., both right-handed or both left-handed, like in FIG. 9B). That is to say, if the first circular retarder 1560 (which includes the effects of the 90° polarization rotation introduced by the liquid crystal cell 210) is left-handed as shown in 1580 of FIG. 16C, the second circular retarder 1540 is also left-handed. For example, if the first circular retarder 1560 has an angle $\theta_1$ that is substantially 45° as shown in 1580 of FIG. 16C, the polarization axis of the second linear polarizer 807 is set such that the angle from the polarization axis to the slow axis of the second retarder layer 805 is substantially at 45°, which makes the second circular retarder 1540 left-handed. And if the first circular retarder 1560 (which includes the effects of the 90° polarization rotation introduced by the liquid crystal cell 210) is right-handed with $\theta_1$ being substantially −45° as shown in 1590 of FIG. 16D, the polarization axis of the second linear polarizer 807 is set such that the angle from the polarization axis to the slow axis of the second retarder layer 805 is substantially at −45°, which makes the second circular retarder 1540 right-handed.

On the other hand, if (n+m) is an odd integer and the retardance of the functional parts is not significant, the configurations of the first and second circular retarders 1560 and 1540 can be determined to be opposite as each other (e.g., one right-handed and one left-handed, like in FIG. 9C). That is to say, if the first circular retarder 1560 is left-handed as shown in 1580 of FIG. 16C (which includes the effects of the 90° polarization rotation introduced by the liquid crystal cell 210), then the second circular retarder 1540 is right-handed. For example, if the first circular retarder 1560 has an orientation $\theta_1$ that is substantially 45° as shown in the left-handed configuration 1580 of FIG. 16C, the polarization axis of the second linear polarizer 807 is set such that the angle from the polarization axis to the slow axis of the second retarder layer 805 is substantially at −45°, which makes the second circular retarder 1540 right-handed. And if the first circular retarder 1560 is right-handed with $\theta_1$ being substantially −45° as shown in 1590 of FIG. 16D (which includes the effects of the 90° polarization rotation introduced by the liquid crystal cell 210), the polarization axis of the second linear polarizer 807 is set such that the angle from the polarization axis to the slow axis of the second retarder layer 805 is substantially at 45°, which makes the second circular retarder 1540 left-handed.

In some other embodiments, the functional parts may contain significant retardance. The retardance of the functional parts may be integrated as a part of the first retarder layer retardance, which may be adjusted to obtain an effective retardance of about $(2m+1)\lambda/4$. The configurations of the first and second circular retarders 1560 and 1540 may be determined accordingly. Thus, efficient delivery of both reflective illumination 1550 and transmissive illumination 1521 to viewer's eyes can be achieved. Other configurations are also possible.

In various preferred embodiments, an air gap between components creates two air-material interfaces, which cause reflections due to index mismatch. These reflections may interfere and compromise the optical performances of the integral. The air-material interfaces can be eliminated by laminating the separate parts together and removing the air gap therebetween. However, adequately applying anti-reflection treatment or incorporating a diffusing property onto surfaces can also conveniently reduce undesirable backreflections and the resultant interference and enhance the optical properties of the integral. In some embodiments, the rear surface of the first retarder layer 205 can be laminated to the front surface of the liquid crystal cell 210 to form an integrated display module as described in FIG. 2. In such arrangements, a diffusing element or structure or an anti-reflection treatment (not shown) can be disposed on the front surface of the first retarder layer 205, the front or rear surface of the reflective parts (not shown), or the rear surface 1512 of the protection panel 1510 to curtail or prevent interference of the reflections and enhance the optical properties. The diffusing structure (not shown) can be a roughened surface or may comprise particles (as discussed in previous section) deposited on the front surface of the first retarder layer 205. In certain embodiments, the diffusing structure may comprise a laminated sheet member (not shown) with diffusing property of Haze value greater than zero. In other arrangements, the front surface of the first retarder layer 205 is laminated to the rear surface 1512 of the protection panel 1510. In such arrangements, an anti-reflection treatment (not shown) or diffusing structure may be disposed on at least one of the rear surface of the first retarder layer 205 and on the front surface of the liquid crystal cell 210 to achieve the equivalent optical performances. Different types of diffusing structures may be used and other configurations are possible (for example, the diffusing structure and/or anti-reflective coating may be located elsewhere).

In such arrangements, the color tone and contrast of the display may be substantially maintained by reducing or minimizing the optical path of light 1521. Color tone can also be maintained by setting the transmission direction of the second linear polarizer 807 at 90 degree with respect to the polarization axis of the first linear polarizer 206 or the reflective polarizer 1535.

With continued reference to FIG. 15A, as discussed above, in other embodiments, the polarization axis of the second linear polarizer 807 can be conveniently set at any orientation in the range of 0 to 360 degrees, e.g., at 90 degrees to the horizontal, regardless the orientation of the polarization axis of the first linear polarizer 206. At least two advantages result. First, setting the polarization axis at 90 degrees provides a cost saving in production. A linear polarizer is a relatively expensive raw material. A regular polarized touch screen is usually made with 45° or 135° light in order to match up with the light transmission direction of a regular LCD, in which case the sheet of linear polarizer will need to be cut diagonally. In one embodiment, there is no need to restrict the orientation of the polarization axis of the second linear polarizer 807, and the polarizer sheet can be cut in any way, whichever is cost beneficial. Second, a 90° transmission direction can provide convenient viewing zones for viewers wearing sunglasses as discussed in connection with FIG. 11.

With further reference to FIG. 15A, the advantage of being able to deliver convenient viewing zones for viewers wearing polarized sunglasses can be achieved by further disposing a third retarder layer 1203 to the front side of the second linear polarizer 807 as described above. The third retarder layer 1203 may comprise a quarter wave retarder having a retardance of about $(2k+1)\lambda/4$, where k an integer and $\lambda$ is about 400 nm-700 nm. The third retarder layer 1203 may comprise a single sheet retarder or a stack of laminated or loose sheets or a film or multiple films. The third retarder layer 1203 may comprise quarter wave plates, half wave plates, or full wave plates. The third retarder layer 1203 converts the otherwise linearly polarized transmission 1521 to a circularly polarized transmission. The advantage of the effect can be similarly understood with reference to discussions of FIGS. 6 and 7. The front surface 1511 of the protection panel 1510 or the front surface 1204 of the third retarder layer 1203 may comprise a highly efficient multi-layer anti-reflection coating, for example, having reflection less than about 1.5% to reduce or prevent the surface reflection 1530 and to increase or maximize the entry of light beam 140 for reflective illumination 1550. In some embodiments, the front surface 1511 of the protection panel 1510 or the front surface 1204 of the third retarder layer 1203 can also comprise a separate transmissive substrate, e.g., glass or plastic, such as PET, PEN, TAC, PC, ARTON, with its front surface being coated with the highly efficient multi-layer anti-reflection coating, for example, providing reflection less than about 1.5%. The rear surface of the separate transmissive substrate can be bonded to the front surface of the second linear polarizer 807 or the front surface of the third retarder layer 1203 with index matching pressure sensitive adhesive (PSA). The combination of reduction or minimization of reflections, 1530 and 1531, and increase or maximization of LCD illumination, 1521 and 1550, in this embodiment, is sufficient to make the display integral 1500 (e.g. PT-TRIOLCD) direct sunlight readable. Values outside the ranges provided above and other configurations may be employed (for example, the anti-reflective coating may be located elsewhere).

Several examples are presented below; however these examples are not limiting.

Example 1

A 10.4" NLP-LCD with right-handed circular polarization output was tested and demonstrates no dark viewing zones for viewers wearing polarized sunglasses.

In comparison, an 10.4" LCD with 45 degree linear polarization output with 200 nits measured brightness, shows dark viewing zones in directions of about 1:00 and 7:00 o'clock when viewed with polarized sunglasses on. This LCD was converted to an NLP-LCD with right-handed circular polarization output by laminating a quarter wave retardation film, 65 um in thickness, with its slow axis oriented at an angle of −45 degree with respect to the linear polarization of the LCD. The brightness of the converted LCD was measured as 185 nits and showed no dark viewing zones when viewed with polarized sunglasses on.

Example 2

A 10.4" NLP-LCD integrated with a polarized resistive touch panel shows no limitation on the orientation of the second circularly polarizing plate on the touch panel. The second right-handed circularly polarizing plates were prepared by laminating together a quarter wave plate retarder described in Example 1 and a linear polarizer having a thickness of 100 um, a transmission ~43%, and a polarization coefficient ~96%. The second right-handed circular polarizer was laminated in various orientations on a 5-wired 10.4" resistive touch panel (82% transmission) to generate low reflection polarized touch panels. The low reflection polarized touch panel with various orientation of the second linear polarization axis was then disposed on the NLP-LCD generated as described in Example 1. Brightness of light output was measured. The brightness measured and the various orientations of the polarization axis are summarized below:

| Orientation of the second linear polarization axis (degrees) | Brightness (nits) of the light output from the touch panel integrated NLP-LCD |
|---|---|
| 0 | 146 |
| 15 | 146 |
| 45 | 148 |
| 75 | 145 |
| 90 | 146 |
| 105 | 145 |
| 135 | 143 |
| 165 | 145 |
| 180 | 146 |

As it can be seen from the measurements, the brightness is generally constant and was not affected by the orientation of the second linear polarization axis of the polarized touch panel. The orientation of 90° showed almost full brightness when it was viewed at 6:00 o'clock of direction and showed dark viewing zones in viewing directions of 3:00 and 9:00 o'clock when viewed through polarized sunglasses. Overall, an arrangement with the second linear polarization axis being at 90° provides more convenient viewing experiences for viewers wearing polarized sunglasses.

In various embodiments describe herein, commercial TFT LCDs, protective panels, resistive touch panel, and conductive films for EMI shield, IR block, screen heater of various sizes and structures can be readily be modified and integrated to generate multi-function display structures that are viewable under direct sunlight and also providing convenient viewing zones for viewers wearing polarized sunglasses. Other advantages are also possible.

Other configurations may also be used. Additional components may be added, components may be removed, or the order of the components may be altered. Values other than those specifically recited above may be used. Other variations, both those well known in the area as well as those yet to be devised are also possible.

What is claimed is:

1. A polarized functional part module for integrating with a liquid crystal display having a liquid crystal layer and a polarizer, PA forward said liquid crystal layer, said functional part module defining vertical and horizontal axes, said functional part module having a module rear surface that may be positioned forward a front surface of said liquid crystal display and a module front surface through which light from said liquid crystal display may exit to a viewer, said module comprising:
an EMI shielding functional part comprising a sheet member; and
a linear polarizer, PB, and a quarter wave retarder, RB,
wherein said EMI shielding functional part sheet member is separated from said polarizer, PA,
wherein said polarizer, PA is the closest linear polarizer to said liquid crystal layer that is forward said liquid crystal layer, and
wherein said module front surface comprises an anti-reflection treatment.

2. The functional part module of claim 1, wherein said EMI shielding functional part is rearward said linear polarizer, PB.

3. The functional part module of claim 1, wherein said quarter wave retarder RB is rearward said linear polarizer, PB.

4. The functional part module of claim 3, wherein said EMI shielding functional part is rearward said retarder, RB.

5. The functional part module of claim 3, further comprising a retarder, RA, rearward said retarder RB.

6. A display device comprising a liquid crystal display integrated with the polarized functional part module of claim 1, said liquid crystal display disposed rearward said polarized functional part module, said liquid crystal display comprising a liquid crystal cell, at least a linear polarizer PA, and a backlighting device.

7. A display device comprising a liquid crystal display integrated with the polarized functional part module of claim 3, said liquid crystal display disposed rearward said polarized functional part module, said liquid crystal display comprising a liquid crystal cell, at least a linear polarizer PA, and a backlighting device.

8. A display device comprising a liquid crystal display integrated with the polarized functional part module of claim 5, said liquid crystal display disposed rearward said polarized functional part module, said liquid crystal display comprising a liquid crystal cell, at least a linear polarizer PA, and a backlighting device.

9. The functional part module of claim 1, further comprising a touch panel, an infrared filter or an LCD heater.

10. The functional part module of claim 1, further comprising a touch panel.

11. The functional part module of claim 1, further comprising an infrared filter.

12. The functional part module of claim 1, further comprising an LCD heater.

13. The functional part module of claim 9, wherein said retarder RB is rearward said linear polarizer PB.

14. The functional part module of claim 13, further comprising a retarder RA rearward said retarder RB.

15. A display device comprising a liquid crystal display integrated with the polarized functional part module of claim 9, said liquid crystal display disposed rearward said polarized functional part module, said liquid crystal display comprising a liquid crystal cell, at least a linear polarizer PA, and a backlighting device.

16. A display device comprising a liquid crystal display integrated with the polarized functional part module of claim 13, said liquid crystal display disposed rearward said polarized functional part module, said liquid crystal display comprising a liquid crystal cell, at least a linear polarizer PA, and a backlighting device.

17. A display device comprising a liquid crystal display integrated with the polarized functional part module of claim 14, said liquid crystal display disposed rearward said polarized functional part module, said liquid crystal display comprising a liquid crystal cell, at least a linear polarizer PA, and a backlighting device.

18. A reflective functional part integrated display comprising:
a liquid crystal display module defining vertical and horizontal axes and having a module front surface that can selectively output linearly polarized light oriented along a first linear polarization axis, said liquid crystal display module comprising, a liquid crystal cell, a linear polarizer PA, and a light module;
a polarized reflective functional part forward said liquid crystal display module, said polarized reflective functional part having a rear surface and comprising a second linear polarizer PB having a second linear polarization axis, and comprising at least two of a touch panel, an EMI shield, an infrared filter and an LCD heater;
a retarder, RA, rearward said polarized reflective functional part;
and a display front surface through which light from said light module exits,
wherein said display front surface comprises an anti-reflection treatment.

19. The display of claim 18, further comprising a retarder layer RB positioned between said second linear polarizer PB and said retarder RA.

20. The display of claim 18, wherein said polarized reflective functional part comprises said EMI shield and said touch panel, said EMI shield being positioned rearward of said touch panel.

21. The display of claim 18, wherein said polarized reflective functional part comprises said EMI shield and said touch panel, said EMI shield being positioned forward of said touch panel.

* * * * *